(12) United States Patent
Ozzie et al.

(10) Patent No.: US 7,900,203 B2
(45) Date of Patent: Mar. 1, 2011

(54) DATA SHARING AND SYNCHRONIZATION WITH RELAY ENDPOINT AND SYNC DATA ELEMENT

(75) Inventors: Jack E. Ozzie, North Bend, WA (US); Robert G. Kirkpatrick, III, Pittsboro, NC (US); Matthew S. Augustine, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 980 days.

(21) Appl. No.: 11/739,236

(22) Filed: Apr. 24, 2007

(65) Prior Publication Data

US 2008/0267221 A1   Oct. 30, 2008

(51) Int. Cl.
*G06F 9/445* (2006.01)
*G06F 9/44* (2006.01)

(52) U.S. Cl. .................. 717/178; 717/177; 709/248

(58) Field of Classification Search ......... 717/172–178; 709/228–229, 235, 248
See application file for complete search history.

(56) References Cited

U.S. PATENT DOCUMENTS

| | | | |
|---|---|---|---|
| 5,388,211 A * | 2/1995 | Hornbuckle ............... 717/178 |
| 5,964,834 A | 10/1999 | Crutcher | |
| 6,295,541 B1 * | 9/2001 | Bodnar et al. ..................... 1/1 |
| 6,400,996 B1 * | 6/2002 | Hoffberg et al. ............. 700/83 |
| 6,553,037 B1 | 4/2003 | Pivowar et al. | |
| 6,594,246 B1 * | 7/2003 | Jorgensen ................... 370/338 |
| 6,760,728 B1 | 7/2004 | Osborn | |
| 6,954,930 B2 * | 10/2005 | Drake et al. ............... 717/178 |
| 7,003,546 B1 | 2/2006 | Cheah | |
| 7,117,494 B2 * | 10/2006 | Rajaram .................... 717/174 |
| 7,124,204 B2 * | 10/2006 | Givoly et al. ............. 709/248 |
| 7,234,000 B2 * | 6/2007 | McEachern et al. ......... 709/235 |
| 7,248,978 B2 * | 7/2007 | Ransom ....................... 702/62 |
| 7,296,266 B2 * | 11/2007 | Curtis ......................... 717/175 |
| 7,451,224 B1 * | 11/2008 | Stamler ...................... 709/228 |
| 7,653,903 B2 * | 1/2010 | Purkeypile et al. ......... 717/178 |
| 7,698,453 B2 * | 4/2010 | Samuels et al. ............. 709/234 |
| 7,702,816 B2 * | 4/2010 | Narayanan et al. .......... 709/248 |
| 7,711,835 B2 * | 5/2010 | Braddy et al. ............... 709/229 |
| 7,729,363 B2 * | 6/2010 | Shenfield et al. ............ 370/401 |
| 7,730,482 B2 * | 6/2010 | Illowsky et al. ............. 717/177 |
| 7,730,484 B2 * | 6/2010 | von Tetzchner ............. 717/178 |
| 7,739,402 B2 * | 6/2010 | Roese et al. ................ 709/242 |
| 7,743,374 B2 * | 6/2010 | Machida ..................... 717/176 |
| 7,802,015 B2 * | 9/2010 | Cheifot et al. .............. 709/248 |
| 2002/0073204 A1 | 6/2002 | Dutta et al. | |

(Continued)

OTHER PUBLICATIONS

Voloh et al, "Fault locator based on line current differential relay synchronized measurements", IEEE, pp. 1-5, 2010.*

(Continued)

*Primary Examiner* — Anil Khatri
(74) *Attorney, Agent, or Firm* — L. Alan Collins; Collins & Collins Incorporated

(57) ABSTRACT

Systems and methods for sharing and synchronizing data using the addition of synchronization data to a feed that contains data items, and in some implementations, at least a node or endpoint that provides relay functionality or relay capabilities to one or more endpoints, are disclosed. Such systems and methods may also include the communication of information about the data that is synchronized, in addition to synchronization of the data itself.

17 Claims, 10 Drawing Sheets

U.S. PATENT DOCUMENTS

| | | |
|---|---|---|
| 2003/0105831 A1 | 6/2003 | O'Kane |
| 2004/0172423 A1 | 9/2004 | Kaasten et al. |
| 2004/0205470 A1 | 10/2004 | Jones et al. |
| 2005/0172296 A1 | 8/2005 | Schleifer et al. |
| 2005/0198299 A1 | 9/2005 | Beck et al. |
| 2006/0004600 A1 | 1/2006 | Summer et al. |
| 2006/0010204 A1 | 1/2006 | Jalava et al. |
| 2006/0106879 A1 | 5/2006 | Zondervan et al. |
| 2006/0173985 A1 | 8/2006 | Moore |
| 2006/0212792 A1 | 9/2006 | White et al. |
| 2006/0218492 A1 | 9/2006 | Andrade |
| 2006/0247961 A1 | 11/2006 | Klemow |
| 2007/0294366 A1 | 12/2007 | Ozzie et al. |
| 2008/0195739 A1 | 8/2008 | Ozzie et al. |
| 2008/0212616 A1 | 9/2008 | Augustine et al. |
| 2008/0243874 A1 | 10/2008 | Suthar et al. |

OTHER PUBLICATIONS

Zhao et al, "Multicasting in delay tolerant networks: semantic models and routing algorithms", ACM SIGCOMM, pp. 268-275, 2005.*

Li et al, "Gateway placement for throughput optimization in wireless mesh networks", Springer, Mobile Netw. Applications, 13:198-211, 2008.*

Stuedi et al, "Wherestore: Location based data storage for mobile devices interacting with the cloud", ACM MCS, pp. 1-8, 2010.*

"Simple Sharing Extensions for RSS and OPML", Retrieved at <<http://msdn.microsoft.com/xml/rss/sse/>>; Dec. 14, 2006.

"Deployment of a Large-scale Peer-to-Peer Social Network", Retrieved at <<http://research.microsoft.com/asia/dload_files/group/system/maze.pdf>>.

"Attensa Feed Server—Secure, Scalable Web Feed Server", Retrieved at <<http://www.attensa.com/products/server/>>; Dec. 14, 2006.

"Snarfer", Retrieved at <<http://www.snarfware.com/download.htm>>; Dec. 14, 2006.

Ken Rimey, "Version Headers for Flexible Synchronization and Conflict Resolution", Retrieved at <<http://www.hiit.fi/publications/pub_files/hiit-2004-3.pdf>>, Nov. 22, 2004.

Leonard Kawell Jr., et al, "Replicated Document Management in a Group Communication System", Retrieved at <<http://delivery.acm.org/10.1145/1030000/1024798/p395-kawell.pdf?key1=1024798&key2=1402853611&coll=GUIDE&CFID=6163663&CFTOKEN=68289132>>, Portland, Or, Sep. 26-28, 1998.

"Microsoft Team RSS Blog; Simple Sharing Extensions for RSS and OPML", Retrieved at <<http://blogs.msdn.com/rssteam/archive/2005/12/01/498704.aspx>>, Dec. 1, 2005.

Benoit Marchal, "Working XML: Expand RSS capabilities with RSS extensions", Retrieved at <<http://www-128.ibm.com/developerworks/xml/library/x-wxxm36.html>>, Aug. 15, 2006.

Vadim Zaliva, et al., "Enhanced "enclosures" support in RSS and ATOM Syndication", Retrieved at <<http://www.crocodile.org/lord/RSSenclosures/RSSenclosures.pdf>>, Dec. 15, 2004.

"Atom Enabled; What is Atom?", Retrieved at <<http://atomenabled.org>>, Apr. 5, 2007.

J. Gregorio, et al., "The Atom Publishing Protocol", Retrieved at <<http://www.ietf.org/internet-drafts/draft-ietf-atompub-protocol-14.txt>>, Copyright The IETF Trust 2007, Mar. 4, 2007.

"Front Page Atom Wiki; The Atom Project", Retrieved at <<http://intertwingly.net/wiki/pie/FrontPage>>, Apr. 5, 2007.

Dave Winer, "RFC: MetaWeblog API", Retrieved at <<http://www.xmlrpc.com/metaWeblogApi>>, Mar. 14, 2002.

"Google Data API's (Beta) Developers Guide: Google Data API's Overview", Retrieved at <<http://code.google.com/apis/gdata/overview.html>>, Apr. 5, 2007.

Ray Ozzie, "Really Simple Sharing", Retrieved at <<http://rayozzie.spaces.live.com/blog/cns!FB3017FBB9B2E142!175.entry>>.

Zimbra, "A Pint of Ale—Ajax Linking and Embedding", Retrieved at <<http://www.zimbra.com/blog/archives/2006/04/zimbra_ale-ajax_linking_and_embedding.html>>, Apr. 3, 2006.

Dion Hinchcliffe, "How Simple Sharing Extensions Will Change the Web", Retrieved at <<http://web2.wsj2.com/how_simple_sharing_extensions_will_change_the_web.htm>>.

MSDN, "Frequently Asked Questions For Simple Sharing Extensions (SSE)", Retrieved at <<http://msdn.microsoft.com/xml/rss/ssefaq/>>, Copyright 2006 Microsoft Corporation.

"Microsoft Team RSS Blog, SSE Update and Tutorial", Retrieved at <<http://blogs.msdn.com/rssteam/archive/2006/01/25/517473.aspx>>, Jan. 25, 2006.

Microsoft Team RSS Blog, "More on SSE", Retrieved at <<http://blogs.msdn.com/rssteam/archive/2005/12/07/501326.aspx>>, Dec. 7, 2005.

Cori Shlegel, "Simple Sharing Extensions Up Close", Retrieved at <<http://kinrowan.net/blog/wp/archives/2005/11/23/sse-up-close>>.

Jon Udell, "Dueling Simplicities", Retrieved at <<http://weblog.infoworld.com/udell/2005/11/22.html>>, Nov. 22, 2005.

Ozzie, et al., "Simple Sharing Extensions For Atom And RSS", Retrieved at <<http://msdn.microsoft.com/en-us/xml/bb510102.aspx>>, May 7, 2007.

* cited by examiner

FEED 510

HEADER 520

ITEM 1 540

SYNC DATA 550

ITEM DATA 560

ITEM 2 580

ITEM N 590

DATA SHARING AND SYNCHRONIZATION WITH RELAY ENDPOINT AND SYNC DATA ELEMENT

BACKGROUND

Synchronizing and sharing data between multiple endpoints may be accomplished in a variety of ways. Many synchronization implementations require specific and perhaps not widely-accepted data interchange formats. The same or different synchronization implementations may be relatively complex, for example, in terms of the rules that synchronization endpoints must follow, the data that must be provided and exchanged when synchronizing, and so on.

In some implementations, particular endpoints may synchronize with other endpoints on the same network, may synchronize with other endpoints in the same general physical location or area, and so on. In the same or other implementations, endpoints may instead or also synchronize with a variety of endpoints that may be considered to be separate or different in a variety of ways. For example, different endpoints might be located on separate networks, might be in varying geographical locations, might be connected using connections with different characteristics (such as bandwidth, latency, and the like), and so on. Endpoints that are separate or different may in some cases not be able to synchronize data as efficiently, and may in some implementations not be able to connect or synchronize data at all.

SUMMARY

The following presents a simplified summary of the disclosure in order to provide a basic understanding to the reader. This summary is not an extensive overview of the disclosure and does not identify key or critical elements of the invention or delineate the scope of the invention. Its sole purpose is to present some concepts disclosed herein in a simplified form as a prelude to the more detailed description that is presented later.

Described herein are various techniques and technologies directed toward sharing and synchronizing data using, in at least some implementations, the addition of synchronization data to a feed that contains data items, and a node or endpoint that provides relay functionality or capabilities to one or more endpoints. In some implementations, one or more endpoints may also communicate information about the data sets that are synchronized, in addition to communicating or synchronizing the data sets themselves.

DESCRIPTION OF THE DRAWINGS

FIG. 5 illustrates an exemplary system that includes an exemplary graphical example of a feed.

DETAILED DESCRIPTION

Described herein are various techniques and technologies directed toward sharing and synchronizing data using, in at least some implementations, the addition of synchronization data to a feed that contains data items, and a node or endpoint that provides relay functionality or capabilities to one or more endpoints. More particularly, described herein are, among other things, methods, systems, and data structures that facilitate the transfer of data between endpoints by "relaying" or repeating information communicated by a first endpoint, through a relay endpoint, to a second endpoint. In some implementations, one or more endpoints may also communicate information about the data sets that are synchronized, in addition to communicating or synchronizing the data sets themselves.

In general, in some implementations, synchronization of data may be implemented, at least in part, by the addition of particular data to a feed of data provided using a possibly widely accepted protocol like RSS ("Really Simple Syndication" or "Rich Site Summary"). For example, in an exemplary implementation with a topology that consists of only two endpoints that communicate with each other, one endpoint might publish an RSS feed that contains some type or types of information. In perhaps one example, the feed might include calendar item information represented using a format like icalendar or hcalendar, but might contain any data represented in a variety of formats. The other endpoint might subscribe to the feed provided by the first endpoint and be notified when, for example, the first endpoint adds a new calendar item or changes an existing calendar item. In addition, a subscribing endpoint might publish its own feed, with the same data as is provided in the original publisher's feed and also with changes or additions made by the subscriber. The original publisher might then subscribe to this second feed. Through these mutual subscriptions, changes made by either endpoint may be reflected in the data maintained by both endpoints, enabling bi-directional synchronization. Multiple endpoints may participate and share data by subscribing to at least one of the feeds provided by another endpoint and similarly publishing their own feed.

In addition to synchronizing with each other in a direct fashion—such as in the example described previously—in some cases a first endpoint may synchronize with a second endpoint, and then the second endpoint may synchronize with a third endpoint. In so doing, in at least some cases, the second endpoint may act as a "relay endpoint" and communicate changes made by the first endpoint to the third endpoint. In some implementations, changes made by the third endpoint may also be communicated to the first endpoint through the second endpoint. In such implementations, or in other implementations, it may be beneficial or useful for the relay endpoint to provide functionality that enables the relaying or transferring of data or information.

Figure 1:
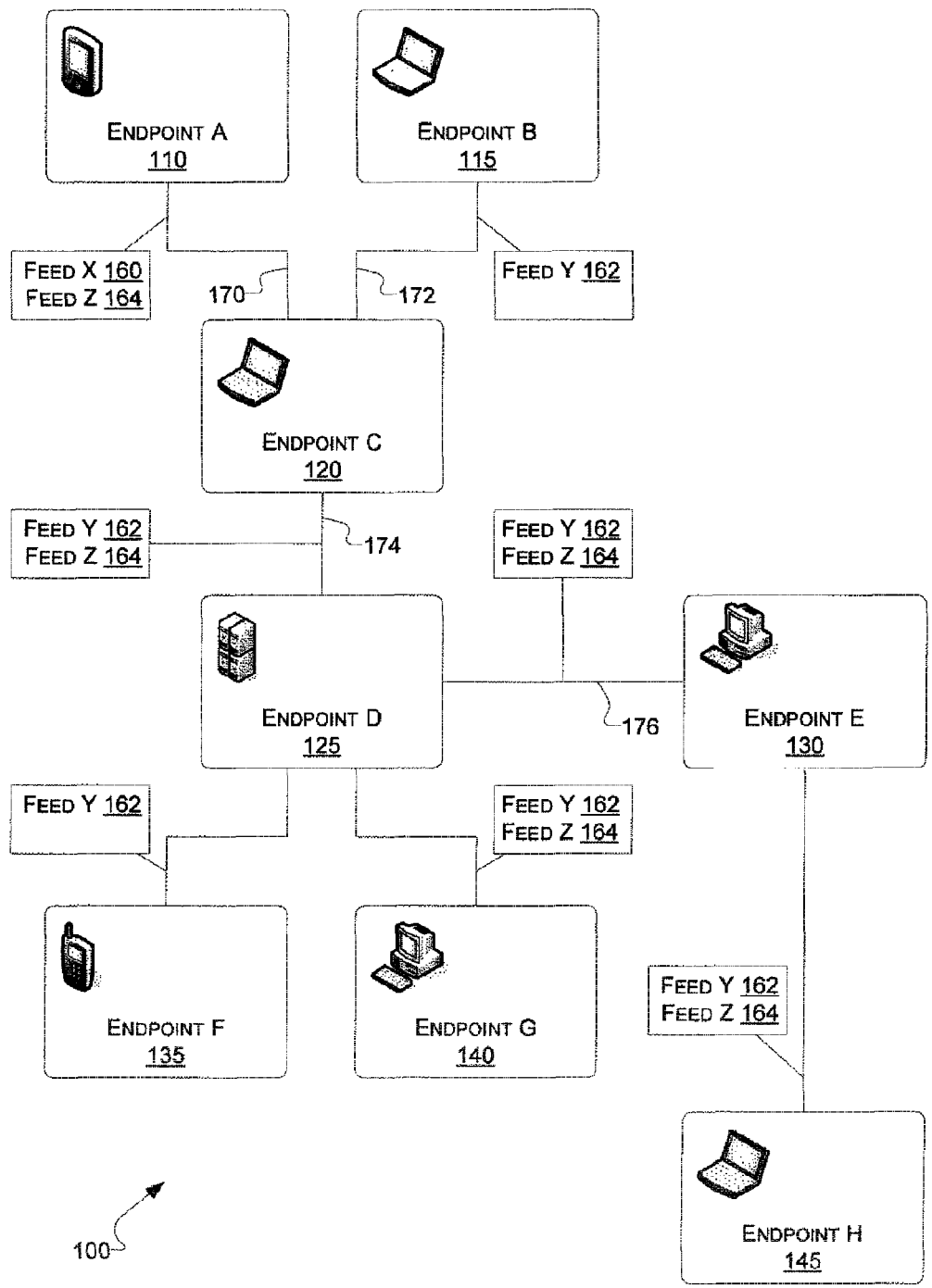
FIG. 1 illustrates an exemplary system in which sharing and synchronization of data might be implemented, with the use of one or more endpoints that provide relay functionality.

Turning now to FIG. 1, illustrated therein is an exemplary system 100 in which sharing and synchronization of data might be implemented, with the use of one or more endpoints that provide relay functionality. As shown, the exemplary system contains a variety of endpoints, including endpoint A 110, endpoint B 115, endpoint C 120, endpoint D 125, endpoint E 130, endpoint F 135, endpoint G 140, and endpoint H 145. The exemplary system also includes a variety of data sets that are shared or synchronized between different endpoints, including data sets represented by feed X 160, feed Y 162, and feed Z 164. Some of the endpoints are shown as connected using the exemplary connection 170, the exemplary connection 172, the exemplary connection 174, and the exemplary connection 176. This description of FIG. 1 may be made with reference to other figures. However, it should be understood that the elements described with reference to FIG. 1 are not intended to be limited to being used with the elements described with reference to other figures. In addition, while the exemplary diagram in FIG. 1 indicates particular elements, in some implementations not all of these elements may exist, and in some implementations additional elements may exist.

Each of the endpoints in this example—including endpoint A 110, endpoint B 115, and so on—might represent one or more general-purpose or dedicated computer systems, including server computers, desktop computers, laptop computers, workstation computers, mobile or cellular telephones, personal digital assistants (PDAs), and the like. In some implementations at least, the specific manner in which an endpoint is implemented or embodied may not be relevant, as long as the endpoint includes executable code or functionality so that it may synchronize or shared data with other endpoints as described herein.

At least some endpoints are shown as connected to each other so that data may be exchanged between the connected endpoints. For example, endpoint A 110 and endpoint C 120 are connected using the exemplary connection 170. Similarly endpoint B 115 and endpoint C are connected using the exemplary connection 172. While not shown with a specific connection, other exemplary endpoints shown as connected—such as endpoint C and endpoint D 125, endpoint D and endpoint E 130, and so on—may be considered to be similarly connected in some fashion so that data may be exchanged between the connected endpoints. The connections shown, or other connections, may be implemented in a wide variety of ways, may use a wide variety of technologies or methods for exchanging data, and so on. At least for the purposes of sharing data, generally, the manner in which an endpoint is connected to another endpoint may not be relevant, as long as both endpoints have some mechanism by which they can exchange feeds of data. As such, in at least some implementations endpoints may be connected by any means by which data may be transmitted, including any type of network—including wired and wireless networks—or any other kind of transfer mechanism, including the transfer of physical media, like a compact disc (CD) or flash memory drive.

Generally, a sharing or synchronization relationship may exist between two endpoints. For example, a sharing relationship might exist between the endpoint A 110 and endpoint B 115, between endpoint A and endpoint C 120, between endpoint A and endpoint H 145, and so on. A particular sharing relationship generally relates to a set of data that is synchronized or shared and that comprises one or more data items, or simply "items."

An endpoint in a sharing relationship may be a publisher, a subscriber, or both a publisher and a subscriber. A publisher may make available a "feed" that contains information associated with the items being shared as part of the sharing relationship. A subscriber may be an endpoint that subscribes to a feed provided by a publisher. In the case where both endpoints in a sharing relationship are publishers and subscribers, each endpoint may make available a feed to which the other endpoint subscribes. Such feeds may be represented, for example, and as will be described in more detail below, by the exemplary feed X 160, the exemplary feed Y 162, and the exemplary feed Z 164.

In at least some exemplary implementations an endpoint may make a "local" change to an item, where a "local" change may be a change made on the particular endpoint for some reason, including a change made by a user, a change made by an automated process, and so on (including users, processes, and the like located on or associated with different endpoints). Then, so the items being shared may be kept the same on subscribing endpoints, the local change may be published as part of a feed. Other endpoints that subscribe to the feed may "merge" the change or changes made available using the feed with their own local store of items. Other endpoints may also make local changes of their own, which may then be merged or incorporated by yet other endpoints. In at least some implementations, including those that use "Simple Sharing Extensions" (SSE), a local change might be made with operations similar to or the same as those described below, for example, with reference to FIG. 7. In the same or other implementations, the merging of a change or changes may be accomplished using operations similar to or the same as those described below, for example, with reference to FIG. 8.

A feed with a local change, or a local change itself, may be provided to another endpoint in a variety of ways, including through the use of "push" or "pull" techniques. In a "push" technique, an endpoint may affirmatively communicate a feed with a change, or a change itself, to another endpoint. In just one example of a push implementation, an endpoint might initiate an HTTP request and include an updated feed that includes a change, or just include a specific change (separate from a feed). The endpoint to which the HTTP request is communicated might accept the feed or the change and merge the feed or change with its own data. In a "pull" technique, an endpoint might retrieve an updated feed or change from some other endpoint and then incorporate the change into its own data. In just example of a pull implementation, an endpoint might initiate an HTTP request to some other endpoint and in response may be provided with a change or updated feed. The requesting endpoint might then merge or incorporate the feed or change into data it maintains.

An endpoint may subscribe to and publish a variety of feeds, which may in turn be represented using a variety of formats. Furthermore, items obtained from a feed that is represented using a particular format need not be published or further distributed using a feed or feeds that use that same format—items may be published in any format supported or understood by the publisher or the subscriber. For example, an endpoint might subscribe to one feed that uses RSS and another feed that uses Atom. That same endpoint may then publish the same set of data, or any other set of data, using RSS, Atom, or any other type of feed format, independent of how the data was originally obtained or represented.

Given some mechanism for synchronizing data between endpoints—such as a feed and a protocol or rules for updating a feed and merging changes in a feed—a variety of endpoints may share and synchronize information. For example, suppose that endpoint A 110 has a sharing relationship with endpoint C 120 and synchronizes two sets of information using two feeds: feed X 160 and feed Z 164. In the same example, endpoint B 115 might have a sharing relationship with endpoint C and synchronize a set of information using feed Y 162. In some implementations, each feed—feed X, feed Y, feed Z, or other feeds that are not shown—might comprise different information. In other implementations, feeds may be related in one or more ways. As just one example, feed X 160 might contain a subset of the information in feed Y 162. This might, for example, enable endpoint C to synchronize only particular pieces of information with endpoint A. Such data partitioning behavior may be useful for a variety of reasons. As just one example, a user associated with endpoint A might not have a business or other reason to see all of the information embodied by the feed Y, but may need to see some subset of the information: the subset of information represented by feed X, in one example.

When multiple endpoints subscribe to and possibly also publish information using a synchronization system like SSE, or some other synchronization system, they may in some cases form a "sharing mesh" or "mesh" of endpoints, such that changes made by one endpoint may be transmitted to and between other endpoints, and thereby be propagated to other endpoints and in some cases throughout some or all of the mesh.

While the endpoints in the system 100 may be embodied in a variety of ways and may be connected in a variety of ways, for the purposes of example suppose that endpoint A 110 and endpoint B 115 are "mobile" in that they are embodied in one or more computing devices that may not typically be located in a single physical or geographical location. For example, endpoint A might be a PDA and endpoint B might be a laptop computer. Endpoint C 120 might also be a laptop or other mobile computer. Further suppose that endpoint A and endpoint B may, at least at certain times, communicate with endpoint C using the connection 170 and the connection 172, respectively. While such connections may be implemented in a variety of ways, in one example the connection 170 might be implemented, at least in part, using a cellular data network like a GPRS, EDGE, EVDO, or HSDPA network, or the like. In this example, when endpoint A and endpoint C synchronize data they may communicate feed X 160 and/or feed Z 164 over such a cellular data network. In the same or another example, the communication between endpoint B and endpoint C might take place over an exemplary connection 172, which might, at least in one example, be implemented using a wireless network such as a Wi-Fi network. In this example, when endpoint B and endpoint C synchronize data they may communicate feed Y 162 over such a wireless network.

In some cases some endpoints, such as endpoint A or endpoint B, might be "pre-configured" with an address of an endpoint with which they may synchronize data. This may enable the endpoint to start sharing and synchronizing data whenever the endpoint or endpoints with which they communicate are available. For example, when an endpoint—such as the laptop represented by endpoint B —communicates using Wi-Fi, the endpoint might be pre-configured with the SSID ("service set identifier") of a Wi-Fi network, and the Wi-Fi network might be provided by or associated with an endpoint, such as endpoint C. Even if endpoint B has not previously communicated or synchronized data with endpoint C, it may be able to "automatically" or without user intervention determine that such a network is available and similarly start synchronizing information, perhaps without user intervention.

Such a pre-configured endpoint address, as well as a variety of other functionality and benefits described herein, may be useful in a variety of scenarios and situations. For example, just one such situation might be an environment after a disaster or emergency has taken place. In such a situation, a doctor responding to an emergency might carry a PDA, represented by endpoint A, with which they can view or enter data that is then communicated, using, in this example, feed X 160 and feed Z 164, to endpoint C. Similarly, an aid worker might carry a laptop, represented by endpoint B, and be able to view and enter data represented by feed Y 162. In some implementations, one or more of such endpoints may be pre-configured, or configured at some other time, to communicate with other endpoints and share and synchronize data. In this example, the shared data might include medical records, disaster reports, and so on, but could include any of a variety of other data.

In some implementations, an endpoint such as endpoint C might also be mobile. For example, in a post-disaster environment where traditional communication networks—such as cellular or fixed-line telephone networks, cable networks, and so on—may be unavailable or saturated with network traffic, or in other scenarios, endpoint C might be embodied by a laptop or portable computer connected to a Wi-Fi wireless access point that provides a short-range Wi-Fi network. Endpoint C might then be moved from place to place—it might be located in a car or truck, for example—so that it might provide a local network in a variety of locations. When endpoint C moves into range of an endpoint that is configured to or can be configured to communicate with endpoint C—such as perhaps endpoint A or endpoint B in this example—the endpoints may synchronize and share data.

The endpoints may share or synchronize data in a variety of ways, including through the use of the operational flows described below in more detail with reference to, for example, FIG. 2 and FIG. 3. For example, an application that is part of endpoint A 110 may have modified data that is synchronized using, say, feed X 160. When endpoint A and endpoint C 120 can communicate—perhaps because a car in which endpoint C is located has moved within range of endpoint A—the data modified by the user of endpoint A may be synchronized with endpoint C. At the same time, endpoint C might have, for example, changes to data represented using feed X 160 and/or feed Z 164, and might synchronize these changes with endpoint A. After such communications, both endpoint A and endpoint C may now contain up-to-date copies of the information represented by feed X and feed Z.

Continuing with this one example, at some subsequent time, endpoint C 120 might move within range of endpoint B 115 and be able to synchronize data with endpoint B. In this specific example, as previously introduced, feed Y 162 may includes a superset of the data represented by feed X 160 (although of course it could contain any data). As a change made by endpoint A 110 and embodied in feed X was previously communicated to endpoint C by endpoint A, that change may now in some implementations be synchronized between endpoint C and endpoint B, this time using the superset feed Y. After such synchronization, endpoint C may contain the change made by endpoint A, even though endpoint A and endpoint B have not synchronized data directly with each other. If endpoint B has made changes to data associated with feed Y, such changes might also be synchronized with endpoint C.

In this example, to this point, endpoint A 110, endpoint B 115, and endpoint C 120 may have synchronized data and, as a result and as one non-limiting example, endpoint C might contain new or changed information provided by endpoint A and endpoint B. However, it may also be desirable for the new or changed information to be communicated to other endpoints in addition to just endpoint A, endpoint B, and endpoint C. Continuing with the current example, endpoint C might move back to a particular location that might have or provide connections to other endpoints. For example, the car carrying the laptop that embodies endpoint C might "return to base," where the endpoint C might be able to connect to one or more other endpoints perhaps using one or more additional or other networks or connections, such the Internet. In a specific example, suppose that when endpoint C is "at base," it is able to communicate with endpoint D 125 over an exemplary connection 174. In this example, endpoint D might represent, say, one or more server computers located in one or more locations. In such a case, and in other cases, endpoint C might be able to communicate with endpoint D by, for example, physically connecting an Ethernet cable for some period of time between endpoint C and endpoint D, or through some other connection means. When such a connection is available, endpoint C might synchronize feed Y 162 and feed Z 164 with endpoint D.

Finally, now that the changes are present on endpoint D 125, they may in some cases be synchronized to a variety of other endpoints. As just one set of examples, suppose that endpoint D has a connection to a network such as the Internet, which might in this case be represented by the connection 176. An endpoint such as endpoint E 130—which perhaps might be a desktop computer in a central office of an aid agency—might also be connected to the Internet, and might synchronize all of the changes retrieved by endpoint C and present on endpoint D by synchronizing feed Y 162 and feed Z 164 with endpoint D. Endpoint E might then synchronize the same changes, or a subset of the same changes or other changes, with another endpoint, such as the exemplary endpoint H 145. Some or all of the changes might also be synchronized in the same or other ways to other endpoints, such as to endpoint F 135—which might be a mobile phone and might use a cellular data network, to endpoint G 140, and so on.

In this example, and in a variety of other scenarios, some endpoints may be considered to be "relay endpoints." A relay endpoint may generally be considered to be an endpoint that relays information from one endpoint to another endpoint. In some implementations, the relaying of information might be implemented by synchronizing data between a first endpoint and the relay endpoint, and then subsequently synchronizing the same or related data from the relay endpoint to the second endpoint. For example, with the exemplary set of endpoints described with reference to FIG. 1, endpoint C 120, endpoint D 125, and endpoint E 130 might each be, in some implementations at least, a relay endpoint. It may also be possible for other endpoints to be relay endpoints if they relay changes made by one endpoint to another endpoint.

It should be understood that a relay endpoint might be used in a wide variety of scenarios and might provide a wide variety of functionality and features to endpoints, networks, and so on. For example, while the previous single example discussed how a relay endpoint might be useful in a post-disaster environment where, say, traditional communication networks are unavailable, relay endpoints may also be useful in a wide variety of other scenarios and implementations. Some of the following text discusses just some of such examples. In doing so, some of the elements of FIG. 1—such as some of the endpoints—may be described as having different exemplary characteristics so they may be used to demonstrate other exemplary implementations.

For example, one or more relay endpoints may be used in some implementations to partition or divide network or data traffic. For example, suppose that endpoint E 130 and endpoint H 145 are located on one local network and that endpoint F 135 and endpoint G 140 are located on some other local network. While endpoint G and endpoint H may want to share and synchronize data—including data in this example represented by feed Y 162 and feed Z 164—the two endpoints do not have a direct connection to each other. In this context, a "direct connection" between two endpoints may be a connection where at least one endpoint has a network addresses that is visible to the other endpoint. For example, two endpoints with public Internet Protocol (IP) addresses may be able to form a direct connection, while two endpoints behind something like a Network Address Translation (NAT) router or endpoint, with only "private" IP addresses, might not be able to form a direct connection. (Note that in this context a "direct connection" does not require that two endpoints be physically connected to each other. Similarly, communication between two "directly connected" endpoints may happen between other intermediary endpoints, such as routers, other computing devices, and so on.) In a variety of scenarios and for a variety of reasons, endpoint G or endpoint H might not have a connection to a common network—like the Internet—and may only be able to communicate with, say, particular endpoints on their local network. This might be the case for security reasons, or for any of a variety of other reasons. However, if endpoints on the local network—in this example, these might be endpoint D 125, which might be on the same local network as endpoint G, and endpoint E 130, which might be on the same local network as endpoint H—synchronize the data used by the other endpoints, endpoint G and endpoint H may still be able to communicate changes. For example, a change made on endpoint G might be synchronized between endpoint G and endpoint D, then synchronized between endpoint D and endpoint E, and finally synchronized between endpoint E and endpoint H.

In some implementations, the connection between two local networks—perhaps represented by connection 176 between endpoint D 125 and endpoint E 130—may be limited or constrained in one or more ways. For example, the connection may be embodied by a low-bandwidth connection, a high-latency connection, or some other type of connection that is limited in one or more ways. In such case, or in other cases, it may be beneficial to minimize the network traffic carried by the connection. One method for minimizing such traffic may involve using a relay endpoint to centralize and collect changes made by multiple endpoints on a local network, and then communicating such collected changes from the relay endpoint to some other network. For example, endpoint F 135 and endpoint G 140 might synchronize changes with endpoint D, and only endpoint D might synchronize changes with endpoint E. In some cases, such an arrangement may be beneficial even when endpoints that are not relay endpoints may communicate with other networks. For example, in one or more examples, endpoint G might be able to communicate—if desired—"directly" with endpoint H 145. In one example, endpoint G might communicate directly with endpoint H if or when the connection between endpoint G and endpoint H is, say, relatively unused or has available bandwidth. However, when the connection is, say, already in use communicating other network traffic or is otherwise not available or only provides limited communication capability, endpoint G might instead just synchronize its changes to an endpoint such as endpoint D, and might then rely on endpoint D to relay the changes to the other network.

In the same or other implementations, communication between two local networks may generally be blocked or limited by one or more intervening computing devices, such as firewalls or similar devices. In such implementations, and in other implementations, communication between the networks may be limited to only one or more devices for which "holes" have been opened in a firewall or similar device. In the context of the exemplary system 100, for example, and where, again for the purposes of demonstration, endpoint D 125 and endpoint E 130 are located on different networks, the exemplary connection 176 may occur through such a hole in a firewall. In such an example, other devices on the network that do not have access to such a hole—like, perhaps, endpoint G 140 or endpoint H 145—may communicate with each other through endpoints that have access to such holes.

In some implementations, a relay endpoint may be capable of synchronizing and relaying any type of data. That is, a relay endpoint may not be limited to synchronizing or relaying just a single type of data or small set of different types of data. For example, a relay endpoint may be configured to synchronize any type of data as long as the data is represented using a feed and synchronization information that conforms to a known synchronization protocol, such as SSE. In such an example, the data communicated in a feed, using elements such as item data elements (perhaps like those described below, for example, with reference to FIG. 5), may be of any type, and may indeed not even be known or "understood" by the relay endpoint, which may only need to know how to interpret and use elements such as the sync data elements in the SSE feed.

A variety of components, modules, and methods may be used on endpoints, such as on one or more endpoints described with reference to FIG. 1, to implement the relaying of data from one endpoint to another. For example, such components may include a "sync module," which may in some implementations implement at least some the operations described below, for example, with reference to FIG. 2. The same or other implementations may use a "directory module," which may in some implementations implement at least some of the operations described below, for example, with reference to FIG. 3, including using one or more "directory feeds." Such directory feeds may exist in an exemplary system such as the exemplary system 100, and may in some cases be represented using one or more of the shown exemplary feeds, such as feed X 160, feed Y 162, or feed Z 164, or may not be shown.

Figure 2:
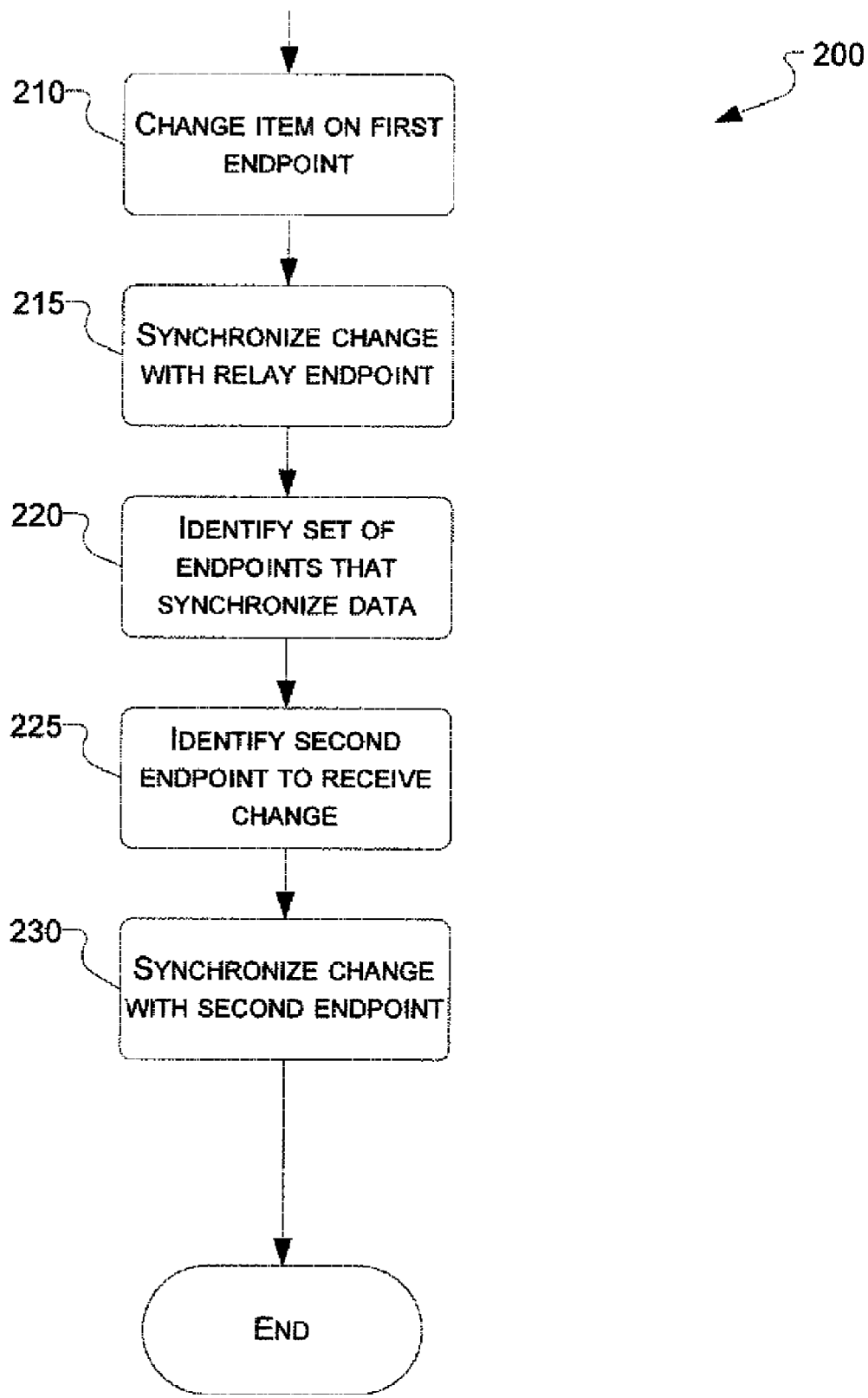
FIG. 2 illustrates an exemplary generalized operational flow that includes operations that may be performed when synchronizing data to and from a relay endpoint.

Turning now to FIG. 2, shown therein is an exemplary generalized operational flow 200 that includes operations that might be performed when synchronizing data to and from a relay endpoint. The following description of FIG. 2 may be made with reference to other figures. However, it should be understood that the operational flow described with reference to FIG. 2 is not intended to be limited to being used with the elements described with reference to these other figures. In addition, while the exemplary operational flow of FIG. 2 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

In an exemplary implementation of operation 210, some item of data may be changed on a first endpoint. As just one example, a user of the first endpoint might use an application to, say, add a new piece of data, change existing data, delete existing data, and so on. In another example, an automated process or some other entity may change the data maintained by a first endpoint. The change may be made by a user, an automated process, or some other entity that is associated with the first endpoint, or an entity that is associated with some other endpoint. In some implementations, the data may be stored on the first endpoint while in other implementations the data may be stored elsewhere and accessed by the first endpoint. In just one example, the first endpoint—the endpoint on which the item is changed—might be an endpoint such as endpoint A 110 or endpoint B 115, both of FIG. 1.

In at least one implementation of operation 215, the change may be synchronized between the first endpoint and some relay endpoint. Such synchronization may be accomplished in a variety of ways, depending on, among other things, the type of synchronization protocol or operations in place, how the first endpoint and the relay endpoint are implemented and connected to each other, and so on. With a synchronization protocol that uses feeds of data with sync data elements, such as SSE, the first endpoint might generate an updated feed that includes the change made in operation 210 or one or more other changes. In at least one example, such an updated feed might be produced using operations including those described below, for example, with reference to FIG. 6 or FIG. 7.

In at least one case, the first endpoint may affirmatively communicate the feed with a change, or just the change itself, to another endpoint. As just one example, the first endpoint might initiate an HTTP request and include the updated feed with the change. The relay endpoint might accept the request and the feed, and might then merge the change in the feed with its own data. Such a merge operation may be implemented, in at least one implementation, using operations such as those described below, for example, with reference to FIG. 8 and other figures. In another implementation, the relay endpoint might retrieve an updated feed from the first endpoint, after which it might merge a change in the retrieved feed with its own data. Such an action might be implemented, in just one example, by the relay endpoint initiating an HTTP request to the first endpoint and in response being provided with the updated feed, after which the relay endpoint merges the feed with data maintained by the relay endpoint.

In some cases a feed used during synchronization may represent all of the items in the synchronized set of data, while in other cases the feed may only include a subset of the items being synchronized, including even just the item or items involved in the change, or just the change itself.

In an exemplary implementation of operation 220, a set of one or more endpoints with which the relay endpoint may synchronize the change may be identified. For example, for each set of data or feed, the relay endpoint may store or access a set of endpoint identifiers. In such an example, and in other examples, each endpoint identifier may identify an endpoint with which the given set of data or feed may be synchronized. In just one example, an endpoint identifier might be a network or other address that the relay endpoint may use when communicating with the particular endpoint—an endpoint identifier might be, for example, a URL, IP address, and so on.

In some implementations, the set of endpoints with which a relay endpoint synchronizes may be provided or associated in some manner with one or more directory modules, directory feeds, and the like. For example, the set of endpoints that provide a particular feed might be communicated between endpoints using a directory feed that contains an item that is both associated with the set of data and includes a set of endpoint identifiers that provide feeds for that set of data. One implementation of such directory functionality is described in more detail below with reference to, for example, FIG. 3.

In at least one implementation of operation 225, an endpoint in the set of endpoints with which the relay endpoint synchronizes data may be identified. In a subsequent operation, in at least some implementations, the relay endpoint may then synchronize the change made by the first endpoint, perhaps by synchronizing an updated feed. As just one example, if a relay endpoint synchronizes a particular set of data or feed with multiple endpoints, in this operation one of those multiple endpoints may be identified. The identified endpoint may be chosen in a variety of ways, and in at least some cases each endpoint in the set may be chosen in successive iterations of this operation, or in parallel, so that all endpoints in the set ultimately may receive the updated or changed data.

Finally, in an exemplary implementation of operation 230, a change is synchronized between the relay endpoint and the identified second endpoint. As before with operation 215, the synchronization may be implemented in a variety of ways, including using "push" or "pull" actions. In some cases, the same change made by the first endpoint may be synchronized to the second endpoint. For example, the relay endpoint might generate an updated feed—that contains the same change made by the first endpoint—after merging the change from the first endpoint, and might use such an updated feed to synchronize the change to the second endpoint. In the same or other cases, the relay endpoint may synchronize some other change to the second endpoint. For example, the relay endpoint may generate a feed that has a change that is related to the change made by the first endpoint but that is different from the change made by the first endpoint. This might happen in a variety of ways. For example and without limitation, the relay endpoint might provide a feed that comprises, say, aggregate data, and may update the aggregate data when specific and non-aggregated data is synchronized from the first endpoint. It may then synchronize a change to the aggregated data to the second endpoint as part of an implementation of operation 230.

Figure 3:
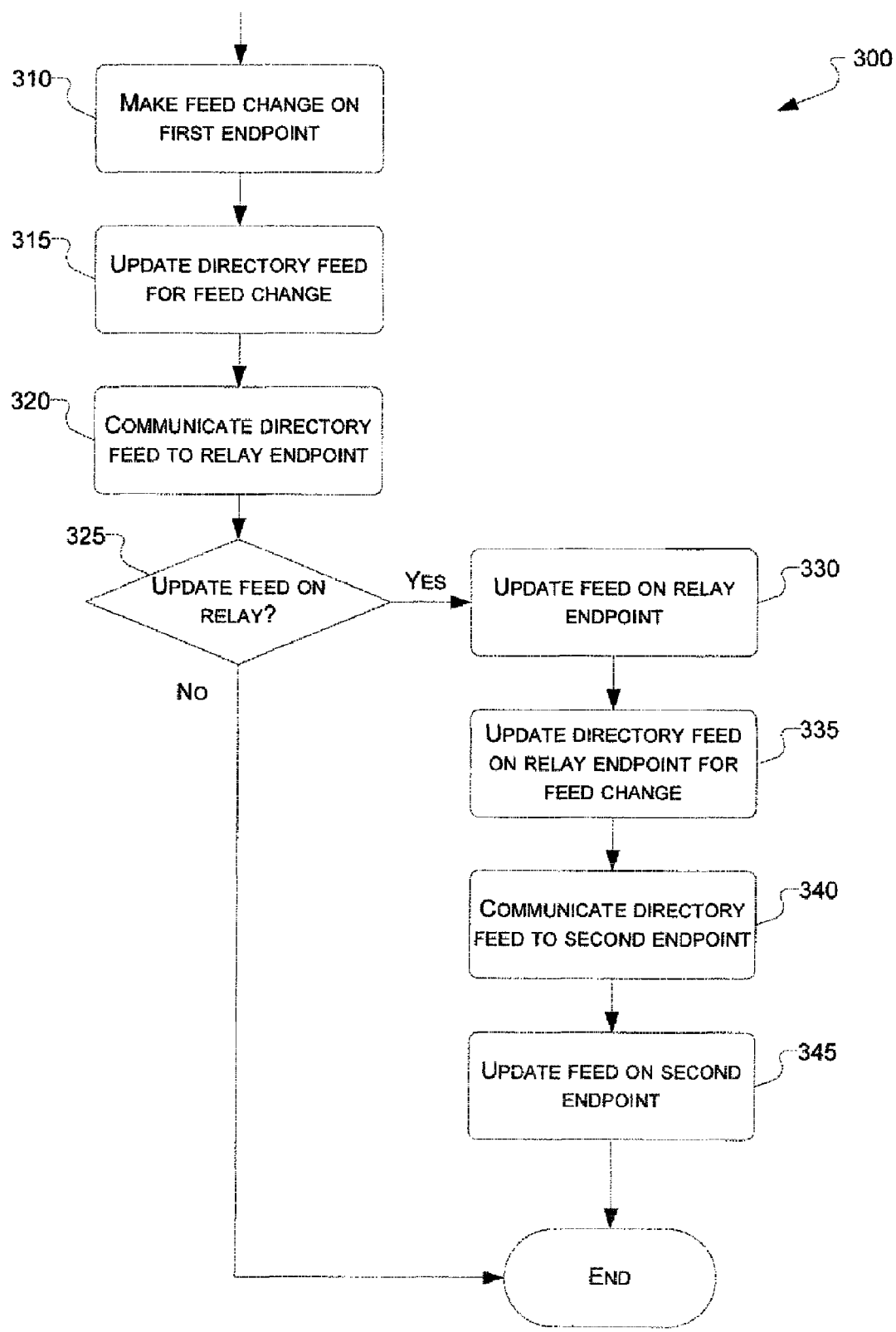
FIG. 3 illustrates an exemplary generalized operational flow that includes operations that may be performed when communicating information about data synchronized between endpoints or when making a change to the data synchronized by a relay endpoint.

Turning now to FIG. 3, shown therein is an exemplary generalized operational flow 300 that includes operations that may be performed when communicating information about data synchronized between endpoints or when making a change to the data synchronized by a relay endpoint. The following description of FIG. 3 may be made with reference to other figures. However, it should be understood that the operational flow described with reference to FIG. 3 is not intended to be limited to being used with the elements described with reference to these other figures. In addition, while the exemplary operational flow of FIG. 3 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

In general, and for example, it may be useful to be able to communicate information about sets of data that are shared and synchronized between endpoints that share and synchronize such data. For example, it may be useful to distribute information about the feeds or data sets available in a "sharing mesh," so that other endpoints may be able to determine, for example, if they want to synchronize a particular feed or set of data, provide a different feed or set of data, make changes to yet another feed or set of data, and so on.

While this information may be communicated in a variety of ways, in some implementations it may be useful to communicate the information in a manner or manners that operate independently of, for example, different networks and endpoints involved in sharing and synchronizing data. Such techniques might not be able to rely on a centralized location for such information, because such a centralized location might not be accessible to all endpoints, or for other reasons.

In some implementations, such functionality might be provided, at least in part, through the use of one or more sets of "directory" information, or "directory feeds," that might be shared or synchronized between endpoints. Such directory information might include information about the sets of data that may be synchronized between endpoints. This information might include, in some implementations and without limitation, metadata about one or more feeds of data. For a particular feed, such metadata might include, for example and without limitation, information such as the name of the feed, a description of the feed, schema information identifying how the feed represents data, how the feed may be accessed—including one or more endpoints at which the feed is available and the appropriate mechanism or mechanisms to use to access the feed at the particular endpoint, and so on.

In at least some implementations, the sharing and synchronizing of such directory metadata might be implemented using the same or similar mechanisms as the sharing and synchronizing of data referred to by the metadata. For example, a directory feed might be implemented as an RSS feed with SSE extensions, and changes to the directory feed might then be synchronized between endpoints using SSE, just as data referred to by the directory feed might be synchronized between endpoints using SSE. In other implementations, the "directory feed" might not be implemented as a "feed" per se, and might instead be some other type of data organized in any way so as to enable the transfer of information about a feed that shares or synchronizes data. In some implementations a directory feed may include information about multiple feeds, while in other implementations only information about a single feed may be included. Furthermore, a directory feed may include in some cases only information about a single change—or may just include the change itself without other directory feed information—while in other cases the directory feed may include multiple changes.

In an exemplary implementation of operation 310, a change to a set of data, represented in some implementations using a feed, may be made on a first endpoint. Such a change might include the addition of or exposing of a new feed of data. For example, the first endpoint might make available a new feed with a particular set of data (including a new feed with at least some data that might already be shared using one or more other feeds). In other examples, the first endpoint might stop making a particular feed available, or might make one or more changes to metadata about a feed that is already available, such as changing the name or description of a feed, changing the way or ways in which a feed is accessed, and so on. In general, such a "feed change" comprises changing some characteristic of a feed itself—including making a feed available or no longer available—and does not comprise operations that only operate on or with items in the feed, such as adding new data items to the feed, changing items in the feed, or deleting items. That is, in general, a feed change may operate on metadata associated with a feed, and not on the data items represented in the feed itself.

In at least one implementation of operation 315, the first endpoint might update one or more directory feeds with information about the feed change made, for example, in operation 310. In some cases, such an update may include information about the change, such as the name, description, access information, and other information about a new feed; the changed data for an existing feed; an identification of a feed that is no longer being provided; and so on. For example, in an implementation that uses an RSS feed with SSE information to share directory information, when a new feed is made available the directory feed may be updated to include a new "item" element with information about the new feed. In some examples, and without limitation, this information might include a name for the feed; a description of the feed; access information for the feed, like a URL at which the feed is available and, perhaps, some representation of how the feed can or should be accessed, such as information about whether the endpoint making the feed available accepts changes (perhaps through the use of an HTTP POST request with an updated feed); and so on.

In one or more exemplary implementations of operation 320, the directory feed may be communicated to a relay endpoint. Such communication may be implemented in a wide variety of ways—including file copies, remote procedure calls, and so on—as long as the information about the feed change is communicated to the relay endpoint. In an implementation where the directory feed is represented using a feed protocol like RSS, perhaps with SSE information, the directory feed may be communicated to the relay endpoint in a manner that is the same as or similar to the way or ways in which other feeds are communicated between endpoints, including mechanisms such as those previously introduced, like through the use of HTTP GET or HTTP POST requests to one or more particular URLs. For example, in some implementations, the first endpoint might provide the directory feed to the relay endpoint by communicating an HTTP POST request to the relay endpoint that contains the directory feed, while in other implementations the relay endpoint might periodically or at other times retrieve a directory feed from the first endpoint, perhaps with an HTTP GET request.

It should be noted that although this operation, and some other operations in this operational flow, refer to the use of a relay endpoint, that in at least some cases the endpoint that obtains the directory feed may not be a relay endpoint. For example, the endpoint that obtains the directory feed might not ultimately share or synchronize data referred to by the directory feed, or other data, between other endpoints. Instead, for example and without limitation, it may use information associated with directory feed in any of a variety of other ways.

In at least one exemplary implementation of operation 325, it may be determined if the relay endpoint will take any further action using the updated directory feed or any further action associated with the feed change made on the first endpoint. If no further action is necessary, the operational flow may end; if further processing should take place, the operational flow may proceed to operation 330. In some implementations, the relay endpoint may, for a variety of reasons, not take any action as a result of a feed change. For example, the directory feed might include a change to a feed that the relay endpoint does not include or make available to other endpoints, and so the relay endpoint may not need to perform any processing for that feed. In another example where no further processing may be necessary, the directory feed may include a change that is associated with a feed provided by the relay endpoint, but the change may be a change that the relay endpoint does not "pass on" or communicate to other endpoints that synchronize data with the relay endpoint.

In other cases, the change in the directory feed may be one that requires further processing on the part of the relay endpoint. In such cases, the operational flow may proceed to operation 330, where at least some of the further processing may be performed. For example, the directory feed may include a change to a feed that is already being made available by the relay endpoint, or may include a notification about a new feed provided by the first endpoint that the relay endpoint may want to relay or make available to other endpoints. In such cases, and in other cases, further processing may be performed so the relay endpoint may make appropriate information available to other endpoints associated with the relay endpoint.

In an exemplary implementation of operation 330, the data feed associated with the feed change may be updated on the relay endpoint. The implementation of this operation may depend, at least in part, on the nature of the change communicated by the directory feed. For example, when the directory feed communicates information about a new feed that is being provided by the first endpoint and the relay endpoint wants to make the new feed available to other endpoints that synchronize data with the relay endpoint, at least part of the implementation of this operation may involve synchronizing the contents of the new feed from the first endpoint to the relay endpoint (again, using one or more of a variety of synchronization mechanisms including those previously introduced). Also as part of this operation, the relay endpoint may then make the newly synchronized feed available to one or more other endpoints that synchronize data with the relay endpoint. For example, in just one implementation, the relay endpoint may retrieve the current contents of the data feed by submitting an HTTP GET request to a URL communicated in the directory feed and associated with the data feed. The relay endpoint may then store the data feed locally or in storage associated with the relay endpoint. Finally, the relay endpoint may make the data feed available to other endpoints, perhaps by ensuring that the data feed is accessible at a particular different URL. Other endpoints may then, at some subsequent point in time, retrieve the contents of the data feed by initiating, for example, an HTTP GET request to the URL provided by or associated with the relay endpoint. (In such an example, the data feed may be made available to endpoints that can access the relay endpoint but that might not have been able to access the first endpoint.)

Other types of changes communicated by the directory feed may also result in one or more updates or changes on the relay endpoint. For example, if a particular data feed is no longer being published by the first endpoint, the relay endpoint might make the data feed no longer available to endpoints that synchronize with the relay endpoint. If metadata about a feed has been changed, the relay endpoint may make some or all of such metadata changes available to endpoints that synchronize with the relay endpoint.

In at least one exemplary implementation of operation 335, the directory feed may be updated to reflect a change made by the relay endpoint. Such a change may enable the directory feed to communicate additional information about the data feed to other endpoints. For example, in the example where a new feed has been made available by the first endpoint and the same feed is also now being provided by the relay endpoint, at least part of this operation may update the directory feed to provide information about how other endpoints may access the new feed on the relay endpoint. For example, the relay endpoint might make the new feed available at a different URL or network address than the first endpoint provides, might make the feed available through different communication mechanisms than those provided by the first endpoint, and so on. Such might be the case, in just one example, when the first endpoint and the relay endpoint are connected to different networks, and perhaps the network address provided by the first endpoint may not be accessible in the same way as a network address provided by the relay endpoint. For example, perhaps the network address provided by the first endpoint is on a "private" or limited access network, or behind a firewall, or so on, while the network address provided by the relay endpoint is "public," or is accessible to more or other endpoints that may not have access to the first endpoint. In such a case, an implementation of operation 335 may update the directory information in the directory feed for the new feed so that the directory information includes the network address of the feed on the relay endpoint. In so doing, a set of endpoint identifiers associated with the new feed may be formed as part of the directory information, and the set of identifiers may later be used by the relay endpoint to determine the endpoints with which to synchronize the feed, and may also be used by other endpoints to determine from where to retrieve the feed.

The manner in which the directory feed is updated may depend on characteristics such as how the directory feed is implemented. For example, if the directory feed uses RSS, perhaps with SSE information, the change to the directory feed might involve performing an SSE update to an existing item in the directory feed, so that the existing item now includes, for example, one or more additional network addresses or endpoint identifiers for the feed. Through such updates, a set of endpoints at which the particular feed is available may be formed. (For example, the relay endpoint might synchronize the directory feed to another relay endpoint, which might then also add one or more network addresses for the same new data feed, and so on.)

In an exemplary implementation of operation 340, the directory feed may be communicated to a second endpoint. The communication of the directory feed may be implemented in a wide variety of ways, including in at least in some implementations manners similar to how the directory feed was communicated between the first endpoint and the relay endpoint in operation 320, by using SSE synchronization, and so on.

Finally, in one or more exemplary implementations of operation 345, a second endpoint may perform one or more operations associated with the data feed using information provided by the directory feed. Such operations may include, for example, retrieving a newly added feed, updating the location or locations at which the second endpoint accesses the feed, no longer retrieving a feed, and so on. For example, when the first endpoint has made a new feed available, and such a feed has been synchronized to the relay endpoint and is now being made available by the relay endpoint, one implementation of this operation might involve the retrieval by the second endpoint of the contents of the feed from the relay endpoint.

In some implementations, the second endpoint might use the updated feed locally—for example, the second endpoint might make the contents of the feed available to a user of the second endpoint. In other implementations, the second endpoint might further make the feed available to other endpoints, and so may be a relay endpoint itself, or might use the feed or directory feed in other ways.

Figure 4:
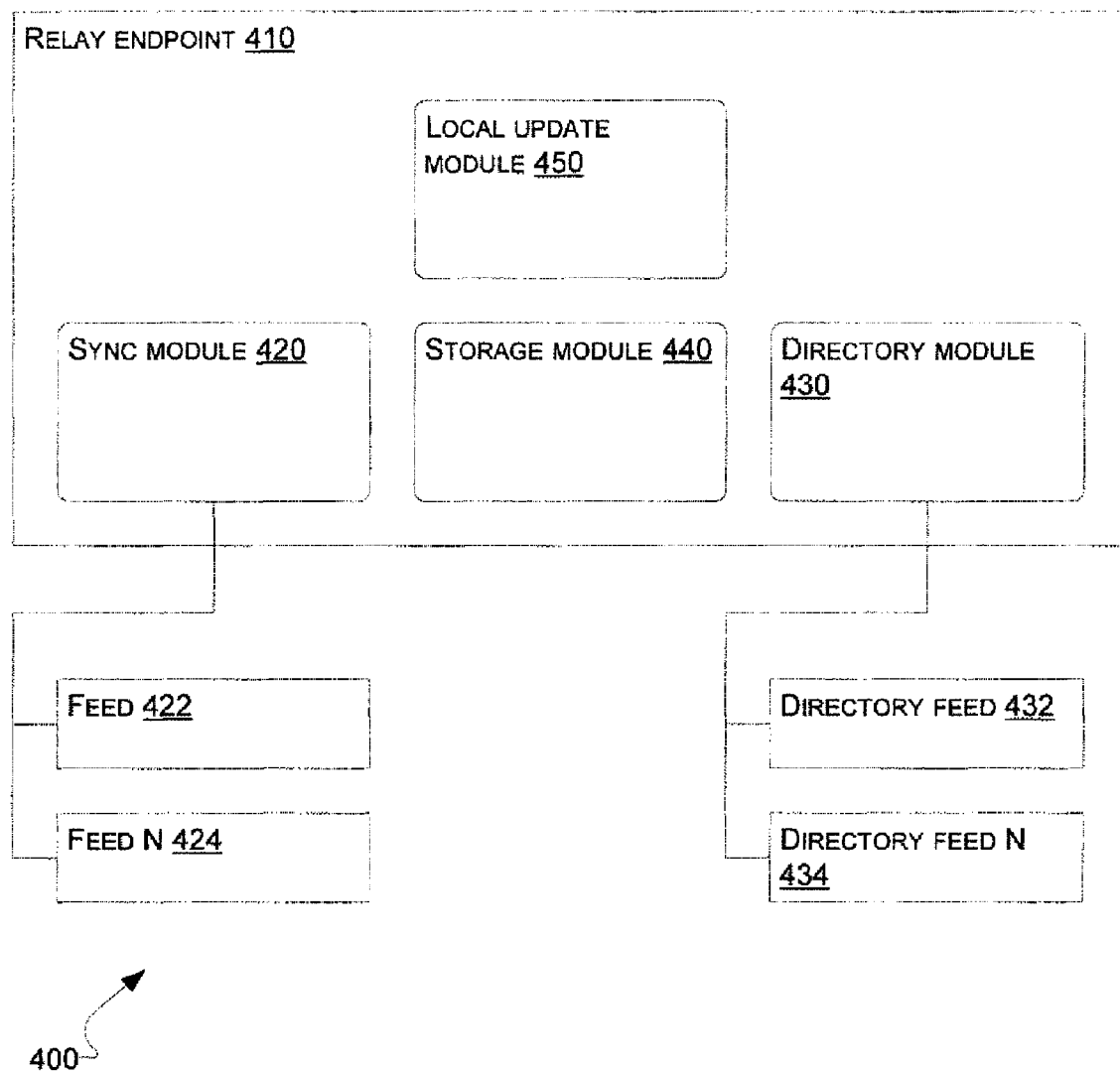
FIG. 4 illustrates an exemplary system that includes a relay endpoint.

Turning now to FIG. 4, shown therein is an exemplary system 400 that includes a relay endpoint. This description of FIG. 4 may be made with reference to other figures. However, it should be understood that the elements described with reference to FIG. 4 are not intended to be limited to being used with the elements described with reference to other figures. In addition, while the exemplary diagram in FIG. 4 indicates particular elements, in some implementations not all of these elements may exist, and in some implementations additional elements may exist. Furthermore, while the exemplary diagram shows elements as being part of or contained by a particular computer system, for example, it should be noted that one or more modules associated with a particular endpoint may also be implemented by one or more other computer systems and connected to the exemplary illustrated computer systems by any means sufficient for exchanging any necessary data.

The exemplary system 400 may contain a relay endpoint 410, a sync module 420, a directory module 430, a storage module 440, and a local update module 450. Also illustrated as associated with the relay endpoint are a feed 422 and a feed N 424, and a directory feed 432 and directory feed N 434.

In general, in at least some exemplary implementations, the relay endpoint 410 may share and synchronize data with multiple other endpoints. For example and without limitation, the relay endpoint may perform at least some of the data sharing and synchronization operations described previously with reference to FIG. 1 and FIG. 2. In addition, in some implementations, the relay endpoint may include directory functionality to enable the communication of metadata about shared and synchronized data, and may in some cases implement at least some of the directory operations described previously with reference to FIG. 3.

The exemplary relay endpoint 410 may contain multiple modules, including some or all of the illustrated modules, as well as other modules, as part of an implementation that enables the relaying of data. In some implementations, the relay endpoint may be implemented by a computing environment or computing device including the exemplary computing environment discussed below with reference to FIG. 12.

In some implementations, the exemplary relay endpoint 410 may include a sync module, such as the exemplary sync module 420. Such a sync module may generally implement operations related to the sharing and synchronizing of data between the relay endpoint and other endpoints, including accepting or retrieving data from other endpoints, merging or incorporating such data with data stored locally or associated with the relay endpoint, and providing or transmitting data for use by other endpoints. In some implementations, the sync module may implement some or all of operation 215, operation 220, operation 225, and operation 230 described previously with reference to FIG. 2. For example, a sync module might include operations associated with synchronizing a change from a first endpoint, identifying one or more of a set of endpoints with which the change might be synchronized, and synchronizing the change to a second endpoint.

With regard to accepting or retrieving data, an exemplary sync module 420 may perform a variety of tasks associated with the input of data, including accepting data—perhaps represented as feeds including perhaps the feed 422 and the feed N 424—submitted by other endpoints, accepting programmatic or web service requests or calls from other endpoints, retrieving data or feeds from other endpoints, and so on. For example, in some implementations, the sync module 420 may receive or obtain a feed in a manner similar to or the same as was described previously with reference to operation 215 of FIG. 2. As shown, the sync module may obtain the feed 422 or the feed N 424, or a variety of other feeds that are not shown. The sync module may perform a variety of tasks using a feed or request, including storing the feed or change (perhaps using the exemplary storage module 440), making the feed available to other modules or endpoints, and so on. As has been previously described and introduced, and as is described in more detail below, a feed might be implemented in a variety of ways and using a variety of formats. For example, in one implementation, a feed might comprise an RSS feed, and each "item" element in the RSS feed might contain information about a data item that is being shared or synchronized between different endpoints, as well as possibly information related to the synchronization of the data item.

In the same or other implementations, the sync module 420 may perform operations associated with merging or incorporating items and changes expressed by a feed or request into a store maintained by or associated with the relay endpoint 410. Such a store of items might be implemented in some embodiments by the exemplary storage module 440. The exemplary storage module 440 might be implemented in a variety of ways, including through the use of local or remote databases, flat files, and any other means by which data might be stored.

In some implementations, the exemplary sync module 420 might merge data from a feed or request as part of, for example, the previously described operation 215 of FIG. 2. In some implementations, at least, operations performed when merging data may in turn include some or all of the operations described below with reference to FIG. 8, among other figures and examples. In examples where a feed comprises an RSS feed and each "item" element in the RSS feed contains information about a data item, the merge module might iterate through all of the "item" elements in the RSS feed document and merge any changes into the store of items maintained by the storage module 440.

With regard to synchronizing changes to other endpoints, and in some cases as part of implementing an operation such as operation 230 described previously with reference to FIG. 2, an exemplary sync module 420 might, among other tasks, generate one or more feeds. Such feeds might include one or both of the exemplary feed 422 and the exemplary feed 424, or other feeds that are not shown, and a feed might include or represent some or all of the items stored by, for example, the storage module 440. In the same or other examples, a sync module might produce a reply to a request received from another endpoint, or initiate a request to another endpoint.

A sync module might generate such a feed or outgoing request or reply in a variety of ways depending upon, among other things, the mechanisms by which the items are stored and the specific format and contents of the feed. For example, in one implementation, a sync module might retrieve particular database rows from a database that is part of an embodiment of storage module 440 and then generate a feed document, perhaps using RSS, that contains "item" elements for the data items that are part of the sharing relationship.

The sync module 420 may in some implementations determine the endpoints with which it synchronizes data. For example, the sync module may access a list of endpoints for a particular set of data or feed, and may then identify endpoints with which it synchronizes the particular set of data or feed, and in so doing implement operations such as operation 220 and operation 225 of FIG. 2. Such a set or list of endpoints may be obtained or determined in a variety of ways, including through the use of information or services associated with a module such as the exemplary directory module 430, described below.

Not all of the data items maintained by the storage module 440 need be used by the sync module 420 or be part of any particular feed; only those data items that are part of a sharing relationship may be used in some implementations to form a generated or provided feed. Furthermore, multiple feeds provided by the sync module may in some cases represent a different set of data items and comprise different elements than the feed or feeds that have been accepted by the sync module. The ability to control the contents of the feeds produced by the sync module may be useful to, for example, partition data by providing different feeds containing different items to different endpoints. As just one example, the relay endpoint might make a feed that contains a subset of data items available to one set of endpoints and make a different feed that contains a different subset of items, or all of the items, available to a different set of endpoints.

In at least some implementations, the exemplary relay endpoint 410 may contain a local update module, like the exemplary local update module 450. Such a local update module might be capable of performing local updates of data items maintained by the relay endpoint 410, including those stored by the storage module 440. In this context, the term "local update" might refer to the change of a data item outside of merge operations that incorporate changes made by other endpoints, including the merge operations that might be performed by an exemplary sync module 420. For example, in just one example, a local update module might update data items when a user edits items or adds new items on the relay endpoint itself, by interacting with the relay endpoint directly—perhaps using an application provided by or associated with the relay endpoint, or indirectly without submitting a feed and having the feed merged by the relay endpoint.

Some implementations of the exemplary relay endpoint 410 may include a directory module 430. Such a directory module may include operations associated with the maintenance and communication of metadata about feeds of data that are synchronized by the relay endpoint, including feeds synchronized using the exemplary sync module 420. For example, a directory module might implement some of the operations described previously with reference to FIG. 3, and in so doing, might obtain information about where a particular feed of data—that may be synchronized by the sync module—may be obtained or accessed, might determine if the relay endpoint should or will synchronize or provide a particular set of data or feed, and might update and communicate directory information to other endpoints with which the relay endpoint communicates.

In some implementations, the relay endpoint may itself communicate directory information with other endpoints using a directory feed or directory feeds, including perhaps the directory feed 432 and the directory feed N 434, or other directory feeds that are not shown. In at least some of such implementations, the relay endpoint may use the sync module 420 to synchronize directory feeds containing directory information to other endpoints.

It should be noted that the exemplary modules associated with the system 400 may not represent single discrete entities within a computer system and may instead be logically comprised of multiple applications, programs, libraries, and the like. For example, a user might maintain their contacts, calendar, and email information using a PIM application. Such an application might store the contact, calendar, and email information in a variety of ways, including as records in a database or in "opaque" files that might be generally only easily accessible, for example, through means provided the PIM application. The user might also maintain sales information using some other application that stores such sales information in another database, another file or set of files, or the like. In such an example, a storage module like the exemplary storage module 440 may comprise any or all of the stores associated with information that is part of a sharing relationship, including all databases, files, and so on, even when the stores are associated with or managed by a variety of applications. Similarly, a local update module 450 might comprise multiple applications, including both the PIM and sales applications mentioned in this specific example, as long as the applications, programs, or the like, provide the capability of modifying the data outside of a merge operation. It should also be noted that while the term "local update" contains the word "local," that not all local updates must necessarily be performed on a single computer system like the relay endpoint 410. In some embodiments, updates to the data items stored by a storage module might be initiated by or performed on, for example, some other computer or device that might be connected to the endpoint in some fashion.

It should also be noted that the sync module 420 and the directory module 430 may in some implementations access a single feed, such as the feed 422 or the directory feed 432, while in other implementations any number of feeds, representing the same or different sets of data, may be accessed. Such additional feeds may be represented by the exemplary feed N 424 and the exemplary directory feed N 434.

Simple Sharing Extensions

As has been previously described, various operations performed as part of sharing items may be implemented using, among other techniques, one or more extensions to existing feed protocols, including SSE. Some of the following description provides more information about SSE, including exemplary feeds and operations such as additions, modifications, and merges.

Turning now to FIG. 5, shown therein is an exemplary system 500 that includes a graphical example of a feed 510. A feed 510 might contain a header 520 as well as some number of items including, in some examples, item 1 540, item 2 580, and item N 590. Each item might contain sync data 550 and item data 560. This description of FIG. 5 may be made with reference to other figures. However, it should be understood that the elements described with reference to FIG. 5 are not intended to be limited to being used with the elements described with reference to other figures. In addition, while the exemplary diagram in FIG. 5 indicates particular elements, in some implementations not all of these elements may exist, and in some implementations additional elements may exist.

A feed may be represented using any of a wide variety of formats. Generally, however, a feed might contain information necessary to communicate item data and sync data, where item data might be data associated with the particular items being shared as part of the feed and sync data might be additional data required or useful for implementing the synchronization of the items. In some implementations, a feed might use a syndication or data sharing format, such as RSS or Atom. In another example, a feed might use a list-processing format, like Outline Processor Markup Language (OPML). In yet another example, a feed might use some other method for sharing data that does not use XML.

Regardless of the format used by the feed, an exemplary feed 510 may in some cases contain a header with header information that may be general to the entire feed, such as the exemplary header 520. In the case where the feed uses RSS, the header 520 might contain some or all of some standard RSS header elements, such as the "rss" element, the "channel" element, the "title" element, the "description" element, and so on.

The header might also contain data, in some cases also represented using XML elements, such as the data described in the following paragraphs. While this data may be described with reference to XML elements, XML attributes, RSS, and so on, the use of XML or RSS is not required. A header, or the entire feed for that matter, may contain some or all of this data and may represent the data in a variety of formats. For example, a header represented using RSS might contain an RSS "channel" element and a "sharing" element beneath the "channel" element. The "sharing" element might in turn contain a number of attributes and sub-elements. However, such a representation—using RSS, XML elements, XML attributes, and so on—is provided for exemplary purposes only. The data represented in such an example may also be represented in any of a wide number of alternate formats.

As just one example, the header 520 might contain information like the following:

```
<channel>
    <sx:sharing since="Tue, 1 Nov 2004 09:43:33 GMT"
        until="Fri, 1 Mar 2005 09:43:33 GMT" version="0.92" >
        <sx:related link="http://x.com/all.xml" type="complete" />
        <sx:related link="http://y.net/B.xml" type="aggregated"
            title="Family Contacts (Dads Copy)" />
        <sx:related link="http://y.net/C.xml" type="aggregated"
            title="Family Contacts (Suzys Copy)" />
    </sx:sharing>
    ...
</channel>
```

In this example, the "channel" element might be the standard RSS "channel" element (other standard RSS header information, like the "title" and "description" elements may exist, and, if so, is not shown). In this example the use of the string "sx:" might indicate a particular XML namespace, perhaps including a namespace related to sharing and synchronizing data as described herein. The use of such an XML namespace prefix may not be required for the sharing of data, except as may be required, for example, by the particular format or formats used to represent the feed. For example, if the feed is represented using XML, one or more namespaces might be used or required.

The header 520 might contain header data like that represented in this example by the "sharing" element including some or all of the "since", "until", and "version" attributes, or the like.

Such data might include a value associated with an attribute like "since", which might represent the date-time from which all items in the feed have been incorporated. In some implementations, a feed might include only the most recent modifications, additions, and deletions within some reasonable time window. In some implementations, these feeds might be referred to as "partial" feeds, whereas feeds containing the complete set of items may be referred to as "complete" feeds. New subscribers to a feed might then initially copy a complete set of items from a publisher before having the ability to process incremental updates. Data like that represented by a "since" attribute might be useful, for example and in addition to other data described herein, as part of an implementation of partial and complete feeds. A partial feed might reference the complete feed, for example, by using one or more links or references in the partial feed. By placing a link to a complete feed, for example, in the channel descriptor, only a reference to the partial feed might need to be distributed to potential subscribers. If such an attribute is not present, the "beginning of time" might be assumed, such that the feed contains the endpoint's complete set of data as of the date-time value represented by the "until" value.

The data might also include a value associated with an attribute like "until", which might represent the last date-time when items were incorporated into the feed. The publisher of the feed might guarantee that the value associated with the "until" attribute will increase if any items in the feed are updated. If this attribute is omitted or blank, the subscriber to the feed might not be able to make assumptions about when the feed was updated.

The data might also include a value associated with an attribute like "version", which might represent the version of a specification—including rules about generating and merging content—that was used when the feed was generated.

In some implementations, the data might also include a value associated with an attribute like "window", which might represent the maximum period of time, in days or some other unit, that might elapse after the value associated with the "until" attribute, before a subscriber is no longer able to synchronize with the feed. Subscribers might use this value to determine the frequency with which they should read a feed, as well as when to read the complete feed in the cases where partial feeds exist. Publishers might use this value for a variety of purposes, including to determine when to remove items from partial feeds, to determine when to actually delete data associated with items that have a "deleted" attribute set to "true", and to determine when to delete items associated with a "resolvedconflicts" element (exemplary "deleted" and "resolvedconflicts" elements are described in more detail below).

In some implementations, one or more pieces of data associated with feeds related to a particular feed might be used. In some cases, like the previously presented example, this data might be represented using one or more "related" elements that are children of a "sharing" element. A "related" element might contain some or all of "link", "title", "type", "since", and "until" attributes, or the like.

Such data might include a value associated with an attribute like "link", which might represent a URL or other reference to a related feed. The data might also include a value associated with an attribute like "title", which might contain a name or description of the related feed.

The data might also include a value associated with an attribute like "type", which might contain as data either "complete" or "aggregated". The value "complete" might be used when the link references a feed that contains a complete set of items associated with the feed. The value "aggregated" might be used when the link references a feed whose contents are being incorporated into this feed by the publisher. In some implementations—for example, in the case where a publisher has aggregated information from other feeds into a larger work—it may be useful for subscribers to see more detailed information about the other feeds. This data might also be used to provide information to subscribing feeds about the feeds of other participants, to which they might also wish to subscribe.

The data might also include a value associated with an attribute like "since", which might represent the starting point of the related feed. If this attribute is omitted or blank, it might be assumed that this is a complete feed. The data might also include a value associated with an attribute like "until", which might represent the ending point of the feed.

In addition to a header 520, an exemplary feed 510 may generally contain one or more item elements, such as item 1 540, item 2 580, and item N 590. Generally, each item element may contain one or both of sync data 550 and item data 560. In an implementation where the feed is provided using RSS, an item, like item 1 540, may be associated with the "item" element defined and used in RSS. (Again, as has been described, feeds may be represented in a wide variety of formats, and are not limited to RSS, XML, or the like.)

When using RSS, as just one example, an item element, like item 1 540, might contain information like the following:

```
<item>
    <sx:sync id="0a7903db47fb0ae8" version="1">
        <sx:history when="Sat, 21 May 2005 09:43:33 GMT"
        by="UserXDeviceY"/>
    </sx:sync>
    <title>This is a test title</title>
    <description>This is a test item description.</description>
</item>
```

Item data 560 may generally comprise information related to the item itself. In the previous example, the item data 560 might include the RSS "title" and "description" elements. In another example, if a feed contains an item for each of a specified set of contacts, the item data 560 might generally contain information about a particular contact's name, address, phone number(s), and so on. The item data information might be represented in any of a wide variety of formats. In the case of contact information, for example, the item information might be represented using the hCard standard, the vCard standard, or any other format that contains contact information. It is noted that the item data may be stored in any format and is not limited to, for example, XML, XHTML, or any other standardized method for representing information. If a feed is associated with information typically represented in binary form, like audio data or image data, the item data might include such binary information, and so on. The item data may also be stored outside of the feed. In such an implementation, the feed may reference the item data, perhaps using an element like the RSS "enclosure" element.

Sync data 550 generally comprises information associated with the sharing and synchronization of the associated item data. In some implementations this might include data represented, for example, using a "sync" element that might have some or all of the "id", "version", "deleted", and "noconflicts" attributes, or the like, as well as additional attributes. The sync data 550 might also include elements that are, in some implementations, children of a "sync" element, including, for example and without limitation, "history", "update" (which might be a child of a "history" element), "conflicts", and "resolvedconflicts", and the like, as well as additional elements. In some implementations, items that include a valid sync data element 550, or the like, may be considered to be "configured for sharing," in that they may contain information used when sharing the item between multiple endpoints.

Such data might include a value associated with an attribute like "id", which might represent the identifier for the particular item. The value of this attribute may in some implementations be unique within a feed and might also be globally unique across feeds if an item is being shared or synchronized. In some implementations, the value of this attribute might be assigned by the creator of the item, and should not be changed by subsequent publishers.

Such data might also include a value associated with an attribute like "version", which might represent the modification sequence number of the item. In some implementations this value might start at "1" and increment by one indefinitely for each subsequent modification.

Such data might also include a value associated with an attribute like "deleted". Such an attribute, if present and when the associated value is "true", might indicate that the associated item has been deleted and that the remaining data is a "tombstone" useful, for example, to propagate deletions. If this attribute is not present, or if it is present with value of "false", then the item might be considered to not be deleted.

Such data might also include a value associated with an attribute like "noconflicts". Such an attribute, if present and when its associated value is "true", might indicate that particular parts of conflict processing, including perhaps conflict detection and conflict preservation, should not be performed for the associated item. Some possible implementations associated with conflict processing are described below. If this attribute is not present, or if it is present with a value of "false", then it might indicate that conflict processing should be performed for the item.

In addition to attributes that might be used with a "sync" element, or the like, some implementations may maintain the chronological change history for an element, possibly through the use of an element that is a child of the "sync" element, and that might, in some implementations, have the name "history". In some implementations, such an element might have some or all of "when" and "by" attributes, or the like, as well as additional attributes. A "history" element might also, in some implementations, sometimes have one or more "update" elements as children, as well as additional elements. An exemplary "update" element is described in more detail below.

Information associated with a change history might include a value associated with an attribute like "when", which might represent the date-time when the most recent modification of the associated item took place. If this attribute is omitted the value might default to the earliest time that can be represented using, for example, the date format specified by the Internet Engineering Task Force (IETF) RFC 822.

Such data might also include a value associated with an attribute like "by", which might identify the unique endpoint or entity that made the most recent modification. In some implementations, the associated value might be some combination of a user and a device (which might enable a given user to edit a feed on multiple devices). In some implementations, the value of this attribute might be used programmatically to break ties in the case where two changes were made at the same time (for example, within the same second). In some embodiments, if this attribute is omitted the value may default to the empty string, which might be less than all other values for purposes of collation and determining the item that takes precedence for various operations.

In some implementations at least one of the "when" or "by" attributes must be present—in such implementations it may be invalid to have neither.

In some implementations, some parts of an item's change history might be maintained through the use of an "update" element, or the like, as part of the item's sync data 560. In some of these implementations, each "update" element might represent a distinct update operation applied to the associated item. In some implementations a new "update" element might be created each time the item is updated.

As just one example, the following XML fragment might indicate that the particular item was modified on May 21, 2005—as is indicated by the "update" element—and then modified again, more recently, on May 23, 2005—as is indicated by the "history" element:

```
<item>
    <sx:sync id="0a7903db47fb0ae8" version="1 ">
        <sx:history when="Mon, 23 May 2005 09:43:33 GMT"
          by="UserXDeviceY">
            <sx:update when="Sat, 21 May 2005 09:43:33 GMT"
```

-continued

```
              by="UserXDeviceY"/>
        </sx:history>
    </sx:sync>
    <title>This is a test title</title>
    <description>This is a test item description.</description>
</item>
```

In some implementations, an "update" element might have one or both the "when" and "by" attributes, as well as other attributes.

Such data might include a value associated with an attribute like "when", which might represent the date-time when the modification associated with this update took place. If this attribute is omitted the value might default to the earliest time that can be represented using, for example, the date format specified by IETF RFC 822.

Such data might also include a value associated with an attribute like "by", which might identify the unique endpoint that made the modification associated with this update. In some implementations, the value of this attribute might be some combination of a user and a device (which might enable a given user to edit a feed on multiple devices). In some implementations, the value of this attribute might be used programmatically to break ties in the case where two changes were made at the same time (for example, within the same second). In some embodiments, if this attribute is omitted the value may default to the empty string, which might be less than all other values for purposes of collation and determining the item that takes precedence for various operations.

Like with the "history" element, in some implementations, at least one of the "when" or "by" attributes must be present—in such implementations it may be invalid to have neither.

Another set of elements that might be part of an item's sync data 550 might be a conflict collection and a resolved conflict collection, perhaps represented using a "conflicts" element and a "resolvedconflicts" element, or the like. Both of these elements might be used, for example, as part of a conflict preservation implementation. Such an implementation might preserve, for example, the "losing" change when two changes conflict. Some examples of conflict preservation implementations are described below, for example, with reference to FIG. 8, FIG. 9, FIG. 10, and FIG. 11.

Figure 6:
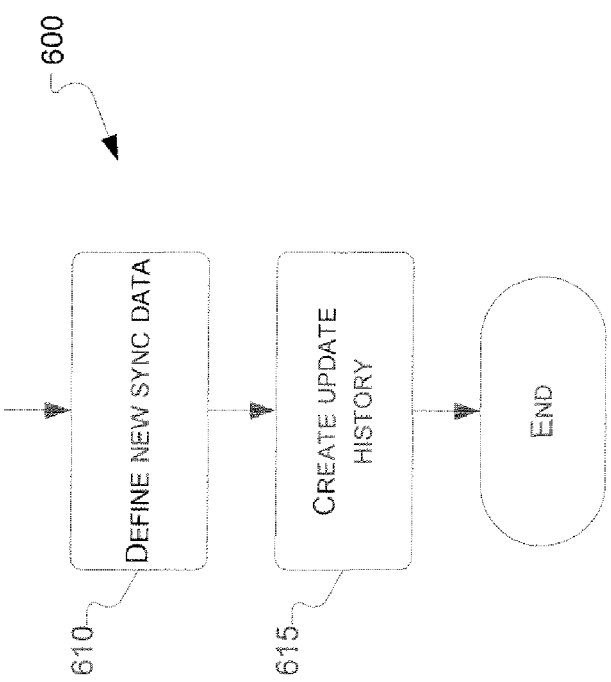
FIG. 6 illustrates an exemplary generalized operational flow including various operations that may be performed when modifying an item to include sharing and synchronization data.

Turning now to FIG. 6, shown therein is an exemplary generalized operational flow 600 including various operations that may be performed when modifying an item to include sharing and synchronization data. The following description of FIG. 6 may be made with reference to other figures. However, it should be understood that the operational flow described with reference to FIG. 6 is not intended to be limited to being used with the elements described with reference to these other figures. In addition, while the exemplary operational flow of FIG. 6 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

The operations described in the exemplary operational flow 600 may generally be performed when an item that has not previously been configured for sharing or synchronization is to be shared. One example of when such operations might be performed is when a new item is created as a result of a local user operation. For example, if a user is synchronizing her contact information and creates a new contact, the operations described with reference to FIG. 6 might be performed so that the contact contains the minimum set of sharing information necessary for the sharing of that contact. Another example of when such operations might be performed might be when a set of items that already exists but that is not configured for synchronization is extended to support sharing and synchronization.

In one example of operation 610, new sync data may be defined. This new sync data might include, for example, a unique identifier and an initial version value. In some cases the initial version value may be a starting version of "1". Further, in implementations that, for example, generate a feed that is represented using XML, this operation might result in the creation of a new "sync" element, or the like, or the definition or creation of data that ultimately results in the creation or generation of a "sync" element when a feed is generated. In such implementations, or in other implementations, the unique identifier data might be associated with an "id" attribute and the version information might be associated with a "version" attribute.

In an exemplary implementation of operation 615, an update history may be created. The newly created update history may contain information about this initial update, perhaps specified using one or both of values that define when the information was defined and by whom the information was defined. In implementations that, for example, generate a feed that is represented using XML, this operation might result in the creation of a new "history" element, or the like, or the definition or creation of data that ultimately results in the generation of a "history" element when a feed is generated. In such implementations, or in other implementations, the time when this information was defined might be associated with a "when" attribute and the entity that defined this information might be associated with a "by" attribute.

As just one example, consider the following RSS item, represented using XML, as it might exist before the operations of the exemplary operational flow 600 are performed:

```
<item>
    <title>This is a test title</title>
    <description>This is a test item description.</description>
</item>
```

After the operations of the exemplary operational flow 600 have been performed, the same item might be represented in a feed as follows:

```
<item>
    <sx:sync id="0a7903db47fb0ae8" version="1">
        <sx:history when="Sat, 21 May 2005 09:43:33 GMT"
        by="UserXDeviceY"/>
    </sx:sync>
    <title>This is a test title</title>
    <description>This is a test item description.</description>
</item>
```

In some implementations, the information defined by the operations of the exemplary operational flow 600 might be considered to form at least part of the sync data 550 described previously with reference to FIG. 5. In the same or other implementations, the item data that existed before the execution of the exemplary operational flow 600 might be considered to form at least part of the item data 560 also described previously with reference to FIG. 5.

Figure 7:
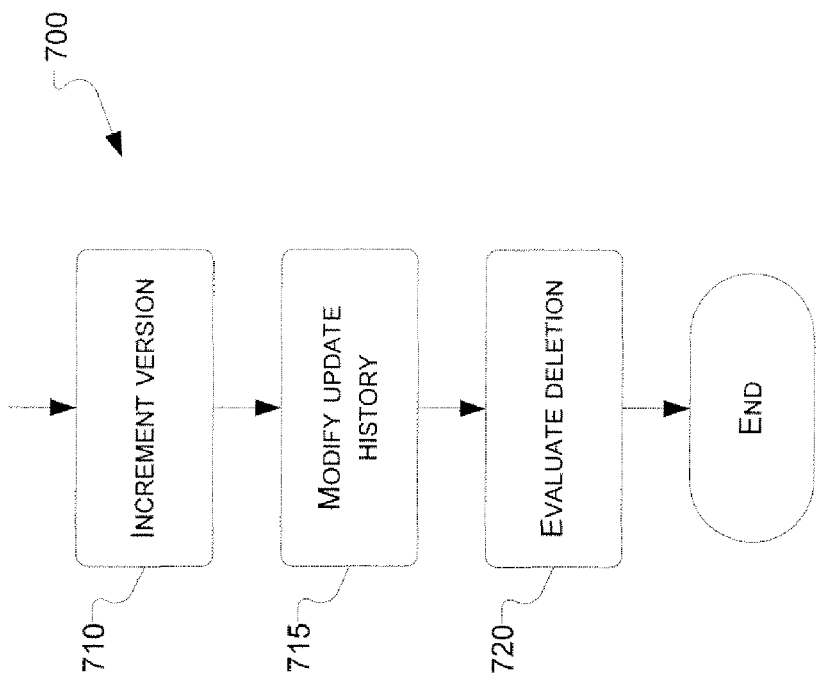
FIG. 7 illustrates an exemplary generalized operational flow including various operations that may be performed when performing a local update of an item.

Turning now to FIG. 7, shown therein is an exemplary generalized operational flow 700 including various operations that may be performed when performing a local update of an item. The following description of FIG. 7 may be made with reference to other figures. However, it should be understood that the operational flow described with reference to FIG. 7 is not intended to be limited to being used with the elements described with reference to these other figures. In addition, while the exemplary operational flow of FIG. 7 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

As before, a local update, as performed by the operations of the exemplary operational flow 700, may be defined as an update that is performed outside of a merge operation. Such a local update may include both the modification of an item—for example, this might include the modification of a contact's address or phone number in a contact item—as well as the deletion of an item.

In an exemplary implementation of operation 710 the version data associated with the item may be incremented, for example, by one. In implementations that, for example, generate a feed that is represented using XML, this operation might result in a change to the value associated with a "version" attribute. If the previous value of the version attribute was "1" a new value might be "2", and so on.

In one implementation of operation 715, the update history of the item might be modified so as to capture information about when this particular modification takes place and also, in some implementations, to maintain at least some information about previous modifications. One possible implementation of this operation might involve first creating a new "update" element, or the like, as the first member of the existing update history (in doing so, any previously existing update information might be moved down in order). Note that, as has been previously stated, while this operation, and others, may be described in some cases in the context of concepts related to XML including, for example, elements and attributes, these descriptions are in no way limiting to an implementation that only uses or results in XML data. For example, in some implementations an update history, including the information described as residing, in some implementations, in "history" and "update" elements, might be created and maintained in memory, using database records or other data structures, and the like. In any implementations, the relevant information may never be stored, persisted, or communicated as XML. Some of the descriptions provided herein use XML concepts only for ease of explanation.

To set the values of the "when" (modification time) and "by" (modifying entity) attributes of the new "update" element, operation 715 might copy the corresponding data from the current "history" element. In doing so, data about the most recent previous modification—which may have been previously recorded with "when" and "by" values in the "history" element—may now be saved in the new "update" element, and so may not be lost if the data associated with the "history" element is updated.

In some implementations, operation 715 may truncate the update history by deleting some or all of the "update" elements. In implementations that truncate the update history, the "update" elements may generally be deleted in reverse order of their creation so that older update history is deleted before newer update history.

Finally, operation 715 might set one or both of the "when" (again, modification time) and "by" (again, modifying entity) attributes of the top-level "history" element to the current time and entity making this modification, respectively.

In one implementation of operation 720, further steps may be performed in the case where the modification is a deletion of the item. When this is the case, in some implementations the "deleted" attribute of the top-level "sync" element may be set to "true". In some implementations, the data associated with the item may also be physically deleted. However, in at least some implementations the top-level "item" element as well as the "sync" element and its children might be retained. (In implementations that use the concept of partial feeds, the actual "item" and "sync" element may be physically deleted when allowed, as defined by the "window" attribute of the "sharing" element, and as described previously with reference to FIG. 5.)

As just one example, consider the following RSS item, represented using XML, as it might exist after having been modified three times in sequence, once per day, by the same endpoint:

```
<item>
    <sx:sync id="0a7903db47fb0ae8" version="4">
        <sx:history when="Tue, 24 May 2005 09:43:33 GMT"
        by="UserXDeviceY">
            <sx:update when="Mon, 23 May 2005 09:43:33 GMT"
            by="UserXDeviceY" />
            <sx:update when="Sun, 22 May 2005 09:43:33 GMT"
            by="UserXDeviceY" />
            <sx:update when="Sat, 21 May 2005 09:43:33 GMT"
            by="UserXDeviceY" />
        </sx:history>
    </sx:sync>
    <title>This is a test title</title>
    <description>This is a test item description.</description>
</item>
```

In this example, the execution of the exemplary operational flow 700 three different times has resulted in the creation of three "update" elements that represent the time at which the modification took place and the entity that made the modification.

If this particular RSS item is modified again two more times, once per day, and the particular implementation only maintains the most recent three versions, the resulting item might look as follows, represented as XML:

```
<item>
    <sx:sync id="0a7903db47fb0ae8" version="6">
        <sx:history when="Thu, 26 May 2005 09:43:33 GMT"
        by="UserXDeviceY">
            <sx:update when="Wed, 25 May 2005 09:43:33 GMT"
            by="UserXDeviceY" />
            <sx:update when="Tue, 24 May 2005 09:43:33 GMT"
            by="UserXDeviceY" />
            <sx:update when="Mon, 23 May 2005 09:43:33 GMT"
            by="UserXDeviceY" />
        </sx:history>
    </sx:sync>
    <title>This is a test title</title>
    <description>This is a test item description.</description>
</item>
```

Figure 8:
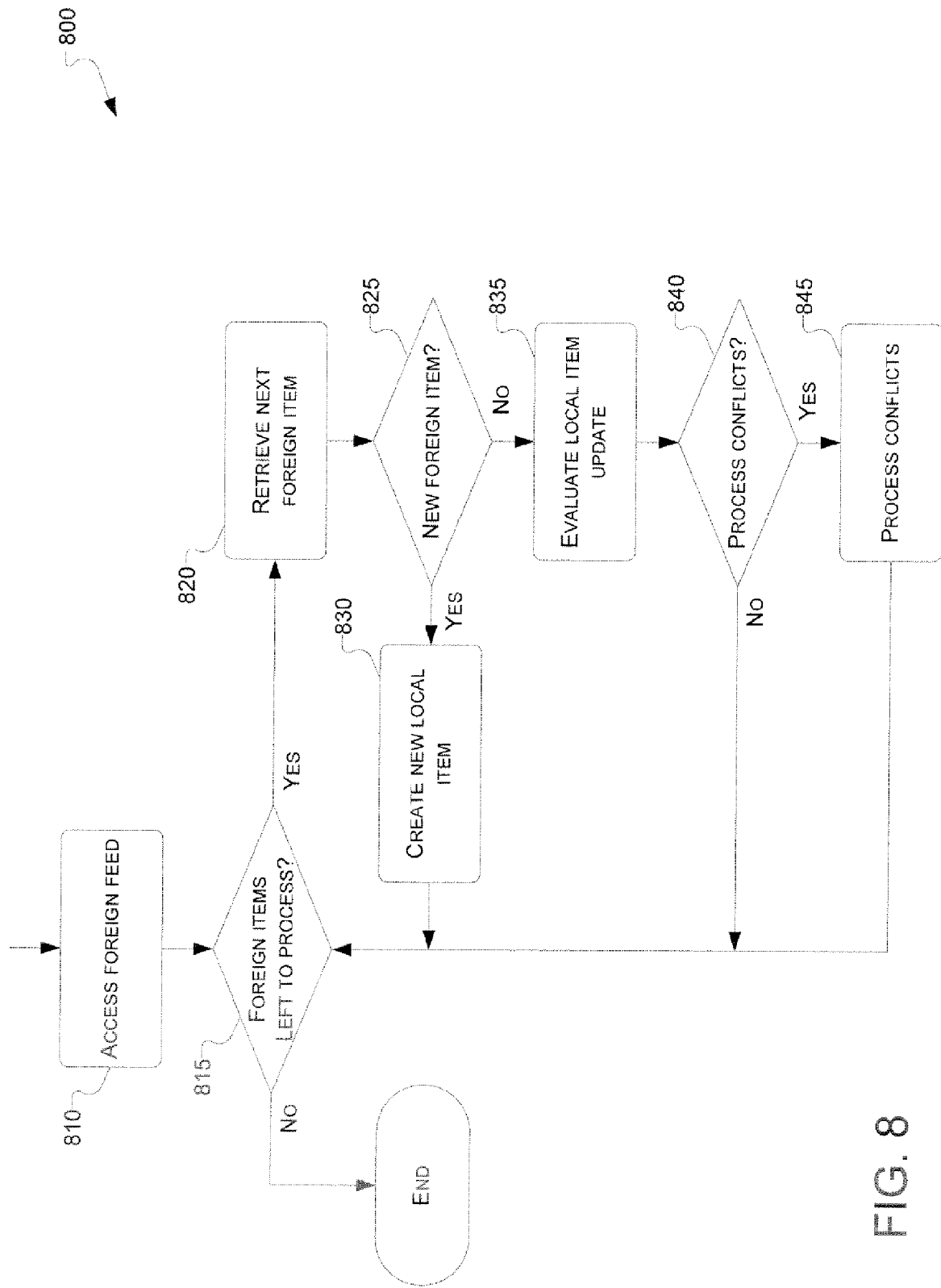
FIG. 8 illustrates an exemplary generalized operational flow that includes various operations that might be performed when merging changes made by another endpoint with the data maintained by a local implementation of an endpoint.

Turning now to FIG. 8, shown therein is an exemplary generalized operational flow 800 that includes various operations that might be performed when merging changes made by another endpoint with the data maintained by a local implementation of an endpoint. The following description of FIG. 8 may be made with reference to other figures. However, it should be understood that the operational flow described with reference to FIG. 8 is not intended to be limited to being used with the elements described with reference to these other figures. In addition, while the exemplary operational flow of FIG. 8 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

In an exemplary implementation of operation 810, a foreign feed that contains information about the items synchronized between two endpoints may be accessed. In some embodiments, a foreign feed may be made up of items that each may contain item data and sync data, for example, perhaps as further described previously with reference to FIG. 5. In some implementations and at particular times, the foreign feed may be the same as or similar to the feed X 160, feed Y 162, or feed Z 164 of FIG. 1. In the same or other implementations, the foreign feed may be a feed that is used as part of synchronizing a change between an endpoint and a relay endpoint, including those changes synchronized as part of, for example, some implementations of operation 215 or operation 230, both of FIG. 2, or as part of at least some implementations of operation 330 of FIG. 3. In some implementations where directory feeds are communicated between endpoints using synchronization techniques that include SSE or the like, a foreign feed may also be used as part of communicating or synchronizing a directory feed, including, in some implementations, as part of operation 320 or operation 340 of FIG. 3. In the same or other implementations, a foreign feed may in some cases be the same as or similar to the feed 422, feed N 424, directory feed 432, or directory feed 434, all of FIG. 4.

In general, a foreign feed may be provided in some fashion by another endpoint. For example, the operation of accessing the foreign feed may in some implementations involve using a network to physically retrieve a file or files that contain the foreign feed. Because the mechanism by which the foreign feed is accessed or transmitted may be irrelevant to the operation of the steps illustrated with reference to FIG. 8, this step may also encompass any other means by which a foreign feed may be accessed, including manual transfer of data using some other form of storage including a CD, a flash drive, a physical printout of data on paper, and so on. A particular foreign feed may not necessarily contain all of the items synchronized by a particular endpoint—for example, an endpoint may synchronize with multiple foreign feeds, each which may contain the same or a different set of items.

It should be noted that while some of the preceding and following description may refer to the foreign feed as, for example, an XML document that contains item and sharing information perhaps like that described elsewhere in this specification, the foreign feed is not so limited. For example, the foreign feed may not necessarily always be provided as an XML document. Any feed provided by another endpoint that contains item and sharing information may possibly be accessed or used as described in this operation and the operational flow 800.

In at least one implementation of operation 815, it may be determined if the foreign feed contains any foreign items that have not yet been processed. In this context, the term "foreign item" may refer to an item defined by the foreign feed, in contrast to a "local item," which may refer to an item stored or managed by the entity that accesses the foreign feed, including, in some implementations, the entity or entities that execute the operational flow 800. If there are no remaining foreign items to process, the operational flow ends. If the foreign feed contains at least one item that has not yet been processed, the exemplary operational flow proceeds to operation 820.

In an exemplary implementation of operation 820, the next foreign item is retrieved from or identified using the foreign feed. For example, if the foreign feed is associated with five foreign items, the first time operation 820 is executed, one of these items may be retrieved. The next time operation 820 is executed, another of these items may be retrieved, and so on. This may continue until all foreign items have been retrieved, at which point operation 815 stops any further retrieval.

In at least one implementation of operation 825, it is determined if the current foreign item—that is, the foreign item retrieved in the most recent execution of operation 820—is a new item that the endpoint performing the exemplary operational flow 800 has not yet evaluated. In some implementations, this operation may be performed by determining if a data store that contains local items and is managed or accessible from the local endpoint contains an item that has the same unique identifier as the current foreign item. If no such local item exists, the foreign item may be determined to be new, and the operational flow may proceed to operation 830. If the local data store contains an item with the same unique identifier as the foreign item, the foreign item may not be considered new, and the operational flow may proceed to operation 835.

If the foreign item is new, the operational flow may proceed to operation 830 where, in an exemplary implementation, data from the foreign item may be used to create a corresponding local item. The implementation of this operation may vary according to different factors including how, for example, local items are stored. In some implementations, this operation may be performed by creating a new database record or records, a new data structure or data structures, and so on, and setting the rows, fields, or the like by copying information from the foreign item. In other implementations, this operation may be performed by copying the information from the foreign item into a feed document maintained locally, and so on.

If the foreign item is not new, the operational flow may proceed to operation 835 where, in at least some implementations, data from the foreign item is used to evaluate if and how the corresponding local item should be updated. For example, data from the foreign item may be determined to be more recent than data from the local item, and so may in some cases overwrite the corresponding data in the local item. A number of other operations may occur as part of the evaluate local item update operation. An exemplary implementation of these other operations is described in more detail below, with reference to FIG. 9. It should be noted that, in at least some implementations, data that is overwritten may need to be saved, at least until the remaining operations that relate to this foreign item are performed. For example, an operation related to processing conflicts may use some of the data that might be overwritten as part of operation 835.

In an exemplary implementation of operation 840, it may be determined if it is necessary to process conflicts associated with the foreign item and the local item. If no conflict processing is needed, the operational flow may proceed to operation 815. If conflict processing is required, the operational flow may proceed to operation 845. This determination may be made in a variety of ways, including by, for example, determining if the foreign item, the local item, or both items contain a flag or some other data that indicates if conflicts should be or should not be processed. In some implementations, such a flag might be the "noconflicts" attribute described previously, for example with reference to FIG. 5. In these implementations, if the "noconflicts" attribute exists and is set to "true", no conflict processing may be necessary.

If conflict processing is indicated, the operational flow may proceed to operation 845, where, in an exemplary implementation, potential conflicts between the foreign item and the local item may be processed. The steps executed during conflict processing may vary in different implementations and may include one or both of a conflict detection operation and a conflict preservation option. One implementation of conflict processing operations, such as these, is described in more detail below, with reference to FIG. 10.

Figure 9:
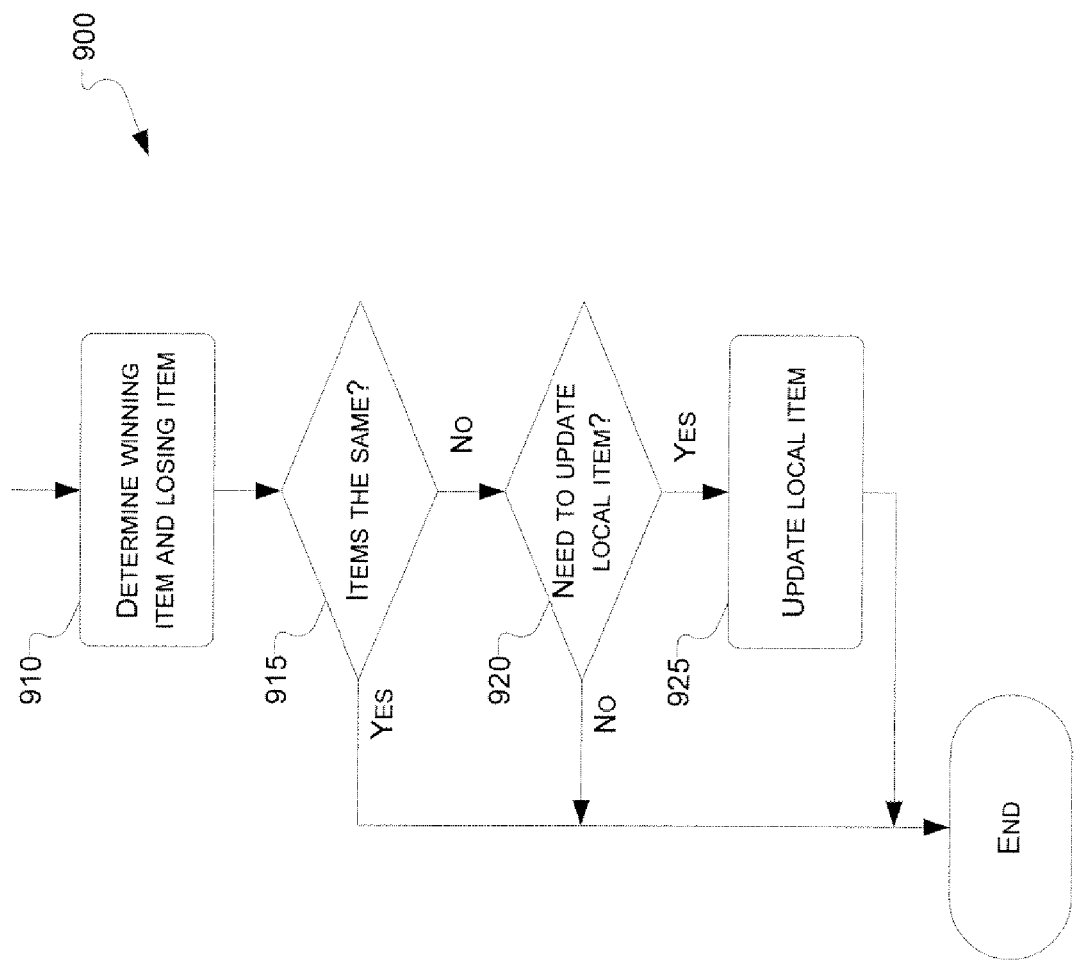
FIG. 9 illustrates an exemplary generalized operational flow that includes operations that might be performed as part of evaluating how a local item might be updated during a merge operation.

Turning now to FIG. 9, shown therein is an exemplary generalized operational flow 900 that includes operations that might be performed as part of evaluating how a local item might be updated during a merge operation. In some implementations, the steps described in FIG. 9 may be used as all or part of an implementation of operation 835 described previously with reference to FIG. 8. This description of FIG. 9 may be made with reference to other figures. However, it should be understood that the operational flow described with reference to FIG. 9 is not intended to be limited to being used with the elements described with reference to these other figures. In addition, while the exemplary operational flow of FIG. 9 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

In an exemplary implementation of operation 910, a "winning item" and "losing item" may be determined from two items presented. For example, when the operations in the operational flow 900 are used in the context of the merge operational flow 800 described previously with reference to FIG. 8, the two items presented may comprise the foreign item and the local item identified as part of the merge operational flow 800. One of these items may be selected to be the winning item, which in some implementations is the item that is determined to have precedence, for some reason or reasons, and the other item may be selected to be the losing item. Furthermore, in some cases neither item may be determined to be the winning item or the losing item.

In some implementations, the determination of the winning item and the losing item may be made by comparing data associated with both items. For example, the winning item and losing item may be determined by a comparison of the current version of the items, the most recent time the items were modified, and the entities that performed the most recent item modification. In the case where the items are similar to those described previously with reference to FIG. 5, this data may be determined, for example, using the "version" attribute of the "sync" element, the "when" attribute of the "history" element, and "by" attribute of the "history" element, respectively. In such an implementation, the version data may be compared first, and an item with a greater version number may be determined to be the winning item. If both items have the same version, the most recent modification time may be compared, and the item with the more recent modification time may be determined to be the winning item. If both modifications were performed at the same time (for example, within the same second), then the entities that performed the modifications may be compared, and the item that has the entity with the "greater" value—as determined by text comparison, for example—may be determined to be the winning item. In implementations where the modification time and modifying entity are not necessarily required to be defined for each item, a comparison may determine that a winning item is the item that has data for a particular field—for example, if only one of the items has a modification time defined, that item may be determined to be the winner in a comparison of modification times.

If one item is determined to be the winning item, the other item may be determined to be the losing item. If neither item is determined to be the winning item, then neither item may be determined to be the winning item or the losing item.

In an exemplary implementation of operation 915, it is determined if the items are considered the "same" for the purposes of updating the local item. In one implementation, this operation may use the results of the previous operation 910. If neither item was identified as the winning item in operation 910, then the items may be considered to be the same, and the operational flow 900 may end. If operation 910 determined a winning item and a losing item, then the items may be determined to not be the same, and the operational flow 900 may proceed to operation 920. Note that in some implementations, the determination of whether the items are the same may use only the synchronization data associated with each item—like the version, modification time, and modifying entity—as described above, for example. In these or other implementations, the determination of whether the items are the same may not use item data, like contact information when the item represents a contact, image information when the item represents an image, and so on. This may mean that the item data associated with each of the two items is different even when the items are determined to be the same in this operation, and vice versa.

In at least one implementation of operation 920, it may be determined whether the local item needs to be updated. For example, when the operational flow 900 exists in the context of some other set of operations that provide a foreign item and a local item, like when the operational flow is executed as part of the merge operational flow 800, this operation may determine if the local item should be updated. In some implementations, it may be determined that the local item should be updated if the foreign item was determined to be the winning item. For example, this might be the case if the foreign item had a greater version number than the local item or had a more recent modification time than the local item. If the local item needs to be updated, the operational flow 900 proceeds to operation 925; otherwise, the operational flow ends.

In an exemplary implementation of operation 925, the local item may be updated. The implementation of this operation may vary according to how, for example, local items are stored. In some implementations, this operation may be performed by modifying a database record or records, a data structure or data structures, and so on, that may store data about the local items, by copying data from the foreign item. In other implementations, this operation may be performed by copying information from the foreign item into a feed document maintained locally, and so on. In at least some cases, both the synchronization data and the item data may be copied and used to update the local item. This means that, as a result, the local item now may have the same item data, same update history, same version, and so on, as the foreign item.

Figures 10, 11:
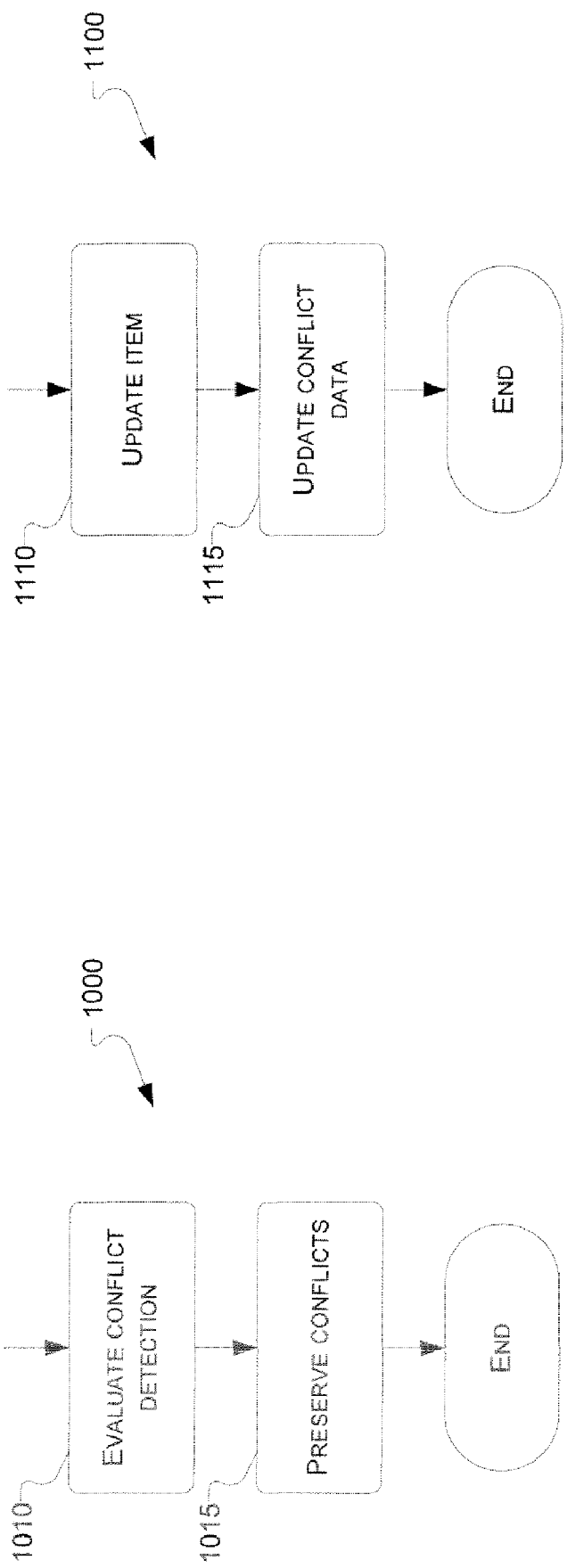
FIG. 10 illustrates an exemplary generalized operational flow that includes operations that might be performed when processing conflicts.
FIG. 11 illustrates an exemplary generalized operational flow that includes operations that might be performed as part of resolving conflicts.

Turning now to FIG. 10, shown therein is an exemplary generalized operational flow 1000 that includes operations that might be performed when processing conflicts. In some implementations, the steps described in FIG. 10 may be used as all or part of an implementation of operation 845 described previously with reference to FIG. 8. This description of FIG. 10 may be made with reference to other figures. However, it should be understood that the operational flow described with reference to FIG. 10 is not intended to be limited to being used with the elements described with reference to these other figures. In addition, while the exemplary operational flow of FIG. 10 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

In an exemplary implementation of operation 1010, it may be determined whether the two presented items are in conflict. In this context, the operational flow 1000 may be assumed to be operating with two items. Such items may be a winning item and losing item, as identified, for example, by the operations of operational flow 900 described previously with reference to FIG. 9. Such items may also be a foreign item and a local item, as described previously, for example, with reference to FIG. 8. In addition, as used herein, the term "in conflict" may refer to the case where separate modifications were made independently to the same item. For example, suppose the same item is modified by two different endpoints, and neither endpoint knows of the other endpoint's modification at the time the endpoint is making its own modification. Such items might be determined to be in conflict, for example, during a merge operation. When this definition of the term "in conflict" is used, it may be possible for items that have the same item data—for example, for a contact that has the same name, address, phone number(s), and so on—to still be determined to be in conflict. This might occur, in one example, if two endpoints independently modified, say, a phone number field of a contact to the same new phone number. In some implementations, additional processing—not described herein—may be used to determine if items like this are truly different.

One procedure for determining if the two items are in conflict in operation 1010 uses information about when and by whom modifications were made. For example, in an implementation that uses data described previously, for example, with reference to FIG. 5, or uses similar data, conflicts may be detected by first identifying the value of the "version" attribute of the "sync" element of the winning item, and defining this value as n. This value may then be decremented by the value of the "version" attribute of the "sync" element of the losing item, and the resulting value stored as an updated n. Then, the values of the "when" (modification time) and "by" (modifying entity) attributes of the losing item's "history" element may be compared with the values of the "when" and "by" attributes of the winning item's "update" element that corresponds to the value of n. If n is zero, then the values of the "when" and "by" attributes of the losing item's "history" element may be compared with the values of the "when" and "by" attributes of the winning item's "history" element.

If the identified "when" and "by" values are the same, or if the "update" element corresponding to n does not exist (when n is greater than zero), the items may be determined to not be in conflict. If the at least one of the "when" and "by" values are not the same, the items may be determined to be in conflict.

As one example of how this implementation of conflict detection might proceed, suppose one endpoint—perhaps called endpoint A—modified an item so the item's representation in a feed was:

```
<item>
    <sx:sync id="0a7903db47fb0ae8" version="3" deleted="false">
        <sx:history when="Thu, 6 Jul 2006 20:27:22 GMT"
        by="endpointA">
            <sx:update when="Thu, 6 Jul 2006 20:27:21 GMT"
            by="endpointA" />
            <sx:update when="Thu, 6 Jul 2006 20:27:20 GMT"
            by="endpointA" />
        </sx:history>
    </sx:sync>
    <title>This is a test title, modified by endpoint A</title>
    <description>This is a test item description.</description>
</item>
```

And suppose another endpoint—perhaps called endpoint B—modified an item so the item's representation in a feed was:

```
<item>
    <sx:sync id="0a7903db47b0ae8" version="3" deleted="false">
        <sx:history when="Thu, 6 Jul 2006 20:27:23 GMT"
        by="endpointB">
            <sx:update when="Thu, 6 Jul 2006 20:27:21 GMT"
            by="endpointA" />
            <sx:update when="Thu, 6 Jul 2006 20:27:20 GMT"
            by="endpointA" />
        </sx:history>
    </sx:sync>
    <title>This is a test title, modified by endpoint B</title>
    <description>This is a test item description.</description>
</item>
```

As is evident when examining the "history" elements of both items, the "when" attribute of the "history" element associated with the item modified by endpoint B shows a modification time that is one second later than the modification time associated with the change made by endpoint A. Using the previously described operations and procedures, in some implementations the item modified by endpoint B would be determined to be the winning item, and the items would be determined to be in conflict. In terms of the conflict detection procedure, the value of n would be determined to be zero, because subtracting the value of the "version" attribute associated with the losing item ("3") from the value of the "version" attribute associated with the winning item ("3") results in the value of zero. Therefore, the values of the "when" and "by" attributes of the "history" elements associated with both items would be compared, and it would be seen that the values of the "when" attributes were different, therefore indicating that the items were in conflict.

In an exemplary implementation of operation 1015, some or all conflict data associated with both items in question may be preserved. In this context, "preserving conflict information" may refer to the preservation of item and synchronization data associated with conflicts. For example, suppose that two items were modified independently and were subsequently determined to be in conflict. Also suppose that the data associated with the winning item was to be used, or was already used, to overwrite the data associated with the losing item. As part of conflict preservation, in some implementations the data associated with the losing item may be preserved. This may lessen or eliminate data loss, and enable, for example, subsequent user intervention to determine if the "correct" data (as defined by a user, for example) was retained.

One procedure for preserving conflicts might use a "conflict collection" and a "resolved conflict collection." In implementations that use feeds that have XML representations, these collections might be implemented as, for example, elements named "conflicts" and "resolvedconflicts". The children of the "conflicts" and "resolvedconflicts" elements may in turn be, for example, one or more instances of "item" elements that existed at some time in losing items. When an "item" element is a member of a conflict collection or a resolved conflict collection, it may be referred to as a "conflict item", "conflict element", "resolved conflict item", or a "resolved conflict element". (Resolved conflicts are described in more detail below, with reference to FIG. 11.)

For example, in the previous exemplary description with reference to operation 1010, the item modified by endpoint A was determined to be the losing item. As a result of a conflict preservation operation like operation 1015, the data associated with the modification made by endpoint A might be preserved as part of the winning item, and may, for example, appear like the following in an XML representation of the feed:

```
<item>
    <sx:sync id="0a7903db47fb0ae8" version="3" deleted="false">
        <sx:history when="Thu, 6 Jul 2006 20:27:23 GMT"
        by="endpointB">
            <sx:update when="Thu, 6 Jul 2006 20:27:21 GMT"
            by="endpointA" />
            <sx:update when="Thu, 6 Jul 2006 20:27:20 GMT"
            by="endpointA" />
        </sx:history>
        <sx:conflicts>
            <item>
                <sx:sync id="0a7903db47fb0ae8" version="3"
                deleted="false">
                    <sx:history when="Thu, 6 Jul 2006 20:27:22 GMT"
                    by="endpointA">
                        <sx:update when="Thu, 6 Jul 2006 20:27:21 GMT"
                        by="endpointA" />
                        <sx:update when="Thu, 6 Jul 2006 20:27:21 GMT"
                        by="endpointA" />
                    </sx:history>
                </sx:sync>
                <title>This is a test title, modified by endpoint A</title>
                <description>This is a test item description.</description>
            </item>
        </sx:conflicts>
    </sx:sync>
    <title>This is a test title, modified by endpoint B</title>
    <description>This is a test item description.</description>
</item>
```

In one implementation of a conflict preservation procedure, if a losing item's conflict collection is not empty, any items in a losing item's conflict collection may be copied to the winning item's conflict collection. In this context, the term "identical" may mean that the items have the same values associated with the version, modification time, and modifying entity (i.e., they might have the same values for the "version", "when", and "by" attributes). If the winning item already has an identical item in its conflict collection, that particular item may not be copied. Similarly, if a losing item's resolved conflict collection is not empty, any items in the losing item's resolved conflict collection may be copied to the winning item's resolved conflict collection, unless the winning item already has an identical item in its resolved conflict collection. Then, any identical items that exist in both the winning item's conflict collection and the winning item's resolved conflict collection may be removed from the winning item's conflict collection.

Finally, in the case where the items were found to be in conflict—for example, they may have been found to be in conflict during operation 1010—the losing item may be preserved as part of the winning item's data. In at least some implementations, this might be implemented by deleting the losing item's conflict and resolved conflict collections (perhaps by removing the losing item's "conflicts" and "resolvedconflicts" elements), and by then appending the losing item to the winning item's conflict collection, perhaps by appending the losing item's "item" element to the winning item's "conflicts" element. The previously presented example XML showing a "conflicts" element demonstrates one exemplary manner in which this might be done for the described example.

Turning now to FIG. 11, shown therein is an exemplary generalized operational flow 1100 that includes operations that might be performed as part of resolving conflicts. This description of FIG. 11 may be made with reference to other figures. However, it should be understood that the operational flow described with reference to FIG. 11 is not intended to be limited to being used with the elements described with reference to these other figures. In addition, while the exemplary operational flow of FIG. 11 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

Some implementations may provide the ability to "resolve a conflict," where such resolution may refer to the modification of an item after one or more conflicts associated with that item have been identified. In at least some cases, the resolution of conflicts may be performed by a user or some other entity outside of the context of the synchronization operations. For example, a user may examine the data identified by a merge procedure as the "winning" and "losing" data, and validate that the data chosen as the winning data was correct, that the losing data should have been chosen, or that some other data—perhaps in some cases a manual combination of pieces of data, for example—should instead be used.

In an exemplary implementation of operation 1110, an item may be updated with the appropriate data. In this context, the appropriate data may be selected from one of the following: the most recent item data (i.e., this might be the case if winning item identified in a merge procedure had the correct data); the data associated with one of the members of the item's conflict collection; and from some other source, including completely new data, some user-performed manual combination of existing and/or new data, and so on. In some implementations, such an update may need to be performed using the same procedures as other updates. For example, in implementations that use the modification operations previously described with reference to FIG. 7, the item's version may be incremented, the update history may be modified, and so on.

In at least one implementation of operation 1115, conflict data may be updated after the item itself is updated in operation 1110. As part of this operation, a resolved conflict collection may be created for the item, if one does not already exist. In cases where a feed is represented using XML, this may at some point result in the creation of a "resolvedconflicts" element. Then, any members of the item's conflict collection that are deemed to no longer be relevant or valid may be moved from the conflict collection to the resolved conflict collection. In cases where a feed is represented using XML, this may at some point result in moving items that are children of the "conflicts" element to be children of the "resolvedconflicts" element. In this context, whether a member of the conflict collection is no longer relevant or valid may be determined by the user or entity resolving the conflict. In some cases this may result in all of the members of the conflict collection being moved to the resolved conflict collection, while in other cases only some, or none, of the members of the conflict collection may be moved to the resolved conflict collection. For example, if a member of the conflict collection exists that is not addressed by the data used during the update item operation 1110, that member may remain in the conflict collection. After any items have been moved to the resolved conflict collection, if the conflict collection contains no remaining items, the conflict collection itself may be deleted which, in XML feed representations, may result in the removal of the "conflicts" element.

As just one example, using the example XML representation described previously with reference to operational flow 1000 and FIG. 10, after one possible conflict resolution procedure, an item might have the following representation:

```
<item>
    <sx:sync id="0a7903db47fb0ae8" version="4" deleted="false">
        <sx:history when="Fri, 7 Jul 2006 20:27:24 GMT"
        by="endpointB">
            <sx:update when="Thu, 6 Jul 2006 20:27:23 GMT"
            by="endpointB">
            <sx:update when="Thu, 6 Jul 2006 20:27:21 GMT"
            by="endpointA" />
            <sx:update when="Thu, 6 Jul 2006 20:27:20 GMT"
            by="endpointA" />
        </sx:history>
        <sx:resolvedconflicts>
            <item>
                <sx:sync id="0a7903db47fb0ae8" version="3"
                deleted="false">
                    <sx:history when="Thu, 6 Jul 2006 20:27:22 GMT"
                    by="endpointA">
                        <sx:update when="Thu, 6 Jul 2006 20:27:21 GMT"
                        by="endpointA" />
                        <sx:update when="Thu, 6 Jul 2006 20:27:20 GMT"
                        by="endpointA" />
                    </sx:history>
                </sx:sync>
                <title>This is a test title, modified by endpoint A</title>
                <description>This is a test item description.</description>
            </item>
        </sx:resolvedconflicts>
    </sx:Sync>
    <title>This is a resolved test title </title>
    <description>This is a test item description.</description>
</item>
```

In this example, the "title" element has been modified to contain new data, the version and update history of the item have been updated as part of the modification, the "item" element that was previously part of the conflict collection has been moved to the resolved conflict collection, and the conflict collection has been removed because it no longer contained any items.

Example Computing Environment

Figure 12:
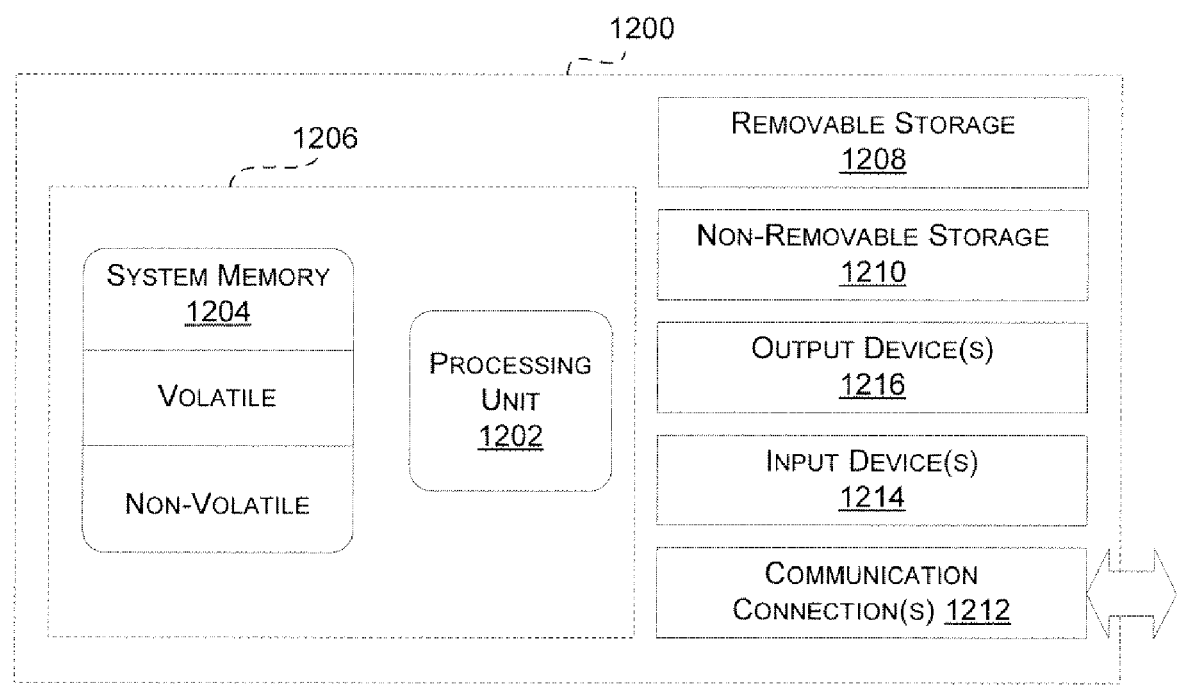
FIG. 12 illustrates an exemplary computer device in which the various technologies described herein may be implemented.

Turning now to FIG. 12, this figure and the related discussion are intended to provide a brief and general description of an exemplary computing environment in which the various technologies described herein may be implemented. Although not required, the technologies are described herein, at least in part, in the general context of computer-executable instructions, such as program modules that are executed by a controller, processor, personal computer, or other computing device, such as the computing device 1200 illustrated in FIG. 12.

Generally, program modules include routines, programs, objects, components, user interfaces, data structures, and so on, that perform particular tasks, display particular information, or implement particular abstract data types. Operations performed by the program modules have been described previously with the aid of one or more block diagrams and operational flowcharts.

Those skilled in the art can implement the description, block diagrams, and operational flows in the form of computer-executable instructions, which may be embodied in one or more forms of computer-readable media. As used herein, computer-readable media may be any media that can store or embody information that is encoded in a form that can be accessed and understood by a computer. Typical forms of computer-readable media include, without limitation, both volatile and nonvolatile memory, data storage devices, including removable and/or non-removable media, and communications media.

Communication media embodies computer-readable information in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communications media includes wired media such as a wired network or direct-wired connection, and wireless media such as acoustic, RF, infrared and other wireless media.

The computing device 1200 illustrated in FIG. 12, in its most basic configuration, includes at least one processing unit 1202 and memory 1204. In some implementations, the computing device 1200 may implement all or part of, for example, one or more of the endpoints described previously with reference to FIG. 1, including endpoint A 110, endpoint B 115, endpoint C 120, endpoint D 125, endpoint E 130, endpoint F 135, endpoint G 140, or endpoint H 145. In the same or other implementations, the computing device 1200 may implement all or part of the exemplary relay endpoint system 410. In some implementations, the processing unit 1202 may be a general purpose central processing unit (CPU), as exists, for example, on a variety of computers, including desktop and laptop computers. Depending on the exact configuration and type of computing device, the memory 1204 may be volatile (such as RAM), non-volatile (such as ROM, flash memory, etc.), or some combination of the two. This most basic configuration is illustrated in FIG. 12 by dashed line 1206. Additionally, the computing device 1200 may also have additional features and functionality. For example, the computing device 1200 may also include additional storage (removable and/or non-removable) including, but not limited to, magnetic or optical disks or tape. Such additional storage is illustrated in FIG. 12 by the removable storage 1208 and the non-removable storage 1210.

The computing device 1200 may also contain one or more communications connection(s) 1212 that allow the computing device 1200 to communicate with other devices and services. For example, as described previously with reference to FIG. 1, the computing device might have one or more connections—such as the connection 170, the connection 172, the connection 174, or the connection 176—and such connections may connect a variety of computing devices, including, for example, endpoints such as endpoint A 110, endpoint B 115, endpoint C 120, and so on. The computing device 1200 may also have one or more input device(s) 1214 such as an image input devices like cameras or scanners, keyboards, mice, pens, voice input devices including microphone arrays, touch input devices, and so on. One or more output device(s) 1216 such as a display, speakers, printer, and so on, may also be included in the computing device 1200.

Those skilled in the art will appreciate that the technologies described herein may be practiced with computing devices other than the computing device 1200 illustrated in FIG. 12. For example, and without limitation, the technologies described herein may likewise be practiced in hand-held devices including mobile telephones and PDAs, multiprocessor systems, microprocessor-based or programmable consumer electronics, network PCs, minicomputers, mainframe computers, and the like. Each of these computing devices may be described, at some level of detail, by the system of FIG. 12, or may be described differently.

The technologies described herein may also be implemented in distributed computing environments where operations are performed by remote processing devices that are linked through a communications network. In a distributed computing environment, program modules may be located in both local and remote devices.

While described herein as being implemented in software, it will further be appreciated that the technologies described herein may alternatively be implemented all or in part as hardware, firmware, or various combinations of software, hardware, and/or firmware.

Although some particular implementations of methods and systems have been illustrated in the accompanying drawings and described in the foregoing text, it will be understood that the methods and systems shown and described are not limited to the particular implementations described, but are capable of numerous rearrangements, modifications and substitutions without departing from the spirit set forth and defined by the following claims.

What is claimed is:

1. A method, comprising:
synchronizing a first change to an item with data associated with a relay endpoint wherein the first change is made on a first endpoint and the first change is represented using a feed comprising a representation of the item that includes a sync data element and an item data element, wherein the synchronizing the first change to the item comprises determining that the item is associated with a local item in the data associated with the relay endpoint and merging the first change to the item with the data associated with the relay endpoint, and wherein the synchronized first change is stored by the relay endpoint, and wherein the relay endpoint and the first endpoint each include a computing device;
identifying a set comprising at least one endpoint identifier, wherein each endpoint identifier in the set identifies an endpoint with which the relay endpoint synchronizes data;
identifying a second endpoint associated with the endpoint identifier;
synchronizing a second change that comprises at least some information also comprised by the first change between the relay endpoint and the second endpoint, wherein the synchronizing the second change comprises generating an updated feed that includes the second change from the data associated with the relay endpoint and providing the updated feed to the second endpoint, and wherein the synchronized second change is stored by the second endpoint, and wherein the relay endpoint is different from the first endpoint and different from the second endpoint.

2. The method of claim 1 wherein synchronizing the first change to the item further comprises:
- determining that the item is associated with a local item in the data associated with the relay endpoint;
- determining that the local item should be updated when the item is associated with the local item, using the sync data element; and
- updating the local item in the data associated with the relay endpoint.

3. The method of claim 1 wherein the relay endpoint is a mobile endpoint and connects with the first endpoint using a wireless connection.

4. The method of claim 1 wherein the first endpoint and the second endpoint are members of different networks and the first endpoint and the second endpoint cannot communicate directly with each other.

5. The method of claim 1 wherein the relay endpoint communicates with the second endpoint through a hole in a firewall that the first endpoint does not use.

6. The method of claim 1 wherein the first endpoint and the relay endpoint are part of a first network, and the first endpoint communicates with the relay endpoint in response to communication between the first network and the second endpoint being constrained.

7. The method of claim 1 wherein the relay endpoint synchronizes any type of data that can be represented using the item data element in the feed.

8. The method of claim 1 wherein the first endpoint is pre-configured with a network address of the relay endpoint.

9. The method of claim 1 wherein identifying the set further comprises:
- using a directory feed that includes an entry associated with the feed, and the entry includes the endpoint identifier.

10. A method, comprising:
- receiving a directory feed on a relay endpoint from a first endpoint, wherein the directory feed comprises information associated with a feed change made on the first endpoint and the feed change is associated with a first feed that comprises an item that includes a sync data element and an item data element;
- synchronizing the first feed to the relay endpoint;
- incorporating the item in the first feed into a data store associated with the relay endpoint updating a second feed that is associated with the first feed;
- ensuring that the second feed includes the item;
- updating the directory feed to incorporate information associated with the second feed; and
- synchronizing a second feed change, wherein the synchronizing the second feed change comprises generating an updated feed that includes the synchronized second feed change and providing the updated feed to the second endpoint.

11. The method of claim 10 wherein the relay endpoint and the first endpoint are the same endpoint.

12. The method of claim 10 wherein the feed change is adding the first feed, or deleting the first feed, or modifying metadata associated with the first feed.

13. The method of claim 10 wherein the second feed is accessible to a second endpoint that is different from the first endpoint and that is different from the relay endpoint.

14. The method of claim 10 wherein updating the directory feed further comprises:
- adding an endpoint identifier that is associated with the relay endpoint and that is associated with the first feed to the directory feed.

15. The method of claim 14 wherein the second feed is accessible to a second endpoint using the endpoint identifier.

16. The method of claim 10 wherein the second feed is accessible to a second endpoint and the second endpoint cannot access the first feed.

17. A relay endpoint system, comprising:
- a processor,
- a storage module coupled to the processor and configured to store data comprising a set of at least one item;
- a sync module configured to:
  - synchronize a first change to the item with the data, wherein the first change is made on a first endpoint and the first change is represented using a feed comprising a representation of the item that includes a sync data element and an item data element, and wherein the synchronizing the first change to the item comprises determining that the item is associated with a local item in the data and merging the first change to the item with the data, and wherein the synchronized first change is stored by the relay endpoint,
  - identify a set comprising at least one endpoint identifier, wherein each endpoint identifier in the set identifies an endpoint with which the relay endpoint system synchronizes information,
  - identify a second endpoint associated with the endpoint identifier, and
  - synchronize a second change that comprises at least some information also comprised by the first change between the relay endpoint system and the second endpoint, wherein synchronizing the second change comprises generating an updated feed that includes the second change from the data associated with the relay endpoint and providing the updated feed to the second endpoint, and wherein the synchronized second change is stored by the second endpoint;
- a directory module configured to:
  - receive a directory feed from a third endpoint, wherein the directory feed comprises information associated with a feed change made on the third endpoint and the feed change is associated with a second feed that comprises a representation of a second item and the representation of the second item includes a second sync data element and a second item data element,
  - update a third feed that is associated with the second feed and that is maintained on the relay endpoint system using the storage module, and
  - update the directory feed to incorporate information associated with the third feed.

* * * * *